(12) United States Patent
Wu et al.

(10) Patent No.: US 11,928,894 B2
(45) Date of Patent: Mar. 12, 2024

(54) METHOD, APPARATUS, AND SYSTEM FOR WIRELESS GAIT RECOGNITION

(71) Applicants: Chenshu Wu, Greenbelt, MD (US);
Feng Zhang, Greenbelt, MD (US);
Beibei Wang, Clarksville, MD (US);
Yuqian Hu, College Park, MD (US);
K. J. Ray Liu, Potomac, MD (US);
Oscar Chi-Lim Au, San Jose, CA (US)

(72) Inventors: Chenshu Wu, Greenbelt, MD (US);
Feng Zhang, Greenbelt, MD (US);
Beibei Wang, Clarksville, MD (US);
Yuqian Hu, College Park, MD (US);
K. J. Ray Liu, Potomac, MD (US);
Oscar Chi-Lim Au, San Jose, CA (US)

(73) Assignee: ORIGIN WIRELESS, INC., Rockville, MD (US)

( * ) Notice: Subject to any disclaimer, the term of this patent is extended or adjusted under 35 U.S.C. 154(b) by 0 days.

(21) Appl. No.: 16/790,610

(22) Filed: Feb. 13, 2020

(65) Prior Publication Data
US 2020/0202117 A1 Jun. 25, 2020

Related U.S. Application Data

(63) Continuation-in-part of application No. 15/326,112, filed as application No. PCT/US2015/041037 on Jul.
(Continued)

(51) Int. Cl.
*G06V 40/20* (2022.01)
*G06F 21/32* (2013.01)
(Continued)

(52) U.S. Cl.
CPC ............. *G06V 40/25* (2022.01); *G06F 21/32* (2013.01); *G06V 40/103* (2022.01); *H04W 4/029* (2018.02)

(58) Field of Classification Search
CPC ............. G06F 21/32; G06F 2221/2111; G06K 9/00348; G06K 9/00369; G06K 9/0051;
(Continued)

(56) References Cited

U.S. PATENT DOCUMENTS

| 7,567,200 B1 * | 7/2009 | Osterweil | A61B 5/1117 342/28 |
| 7,916,066 B1 * | 3/2011 | Osterweil | A61B 5/1117 340/573.1 |

(Continued)

OTHER PUBLICATIONS

Adib et al., "Smart Homes that Monitor Breathing and Heart Rate", Apr. 2015, ACM (Year: 2015).*
(Continued)

*Primary Examiner* — Zhiyu Lu

(57) ABSTRACT

Methods, apparatus and systems for wireless gait recognition and rhythmic motion monitoring are described. In one example, a described system comprises: a transmitter, a receiver, and a processor. The transmitter is configured for transmitting a first wireless signal towards an object in a venue through a wireless multipath channel of the venue. The receiver is configured for: receiving a second wireless signal through the wireless multipath channel between the transmitter and the receiver. The second wireless signal differs from the first wireless signal due to the wireless multipath channel which is impacted by a rhythmic motion of the object. The processor is configured for: obtaining a time series of channel information (CI) of the wireless multipath channel based on the second wireless signal, monitoring the rhythmic motion of the object based on the time series of CI (TSCI), and triggering a response action based on a result of the monitoring.

26 Claims, 21 Drawing Sheets

Related U.S. Application Data 17, 2015, application No. 16/790,610 is a continuation-in-part of application No. 16/127,151, filed on Sep. 10, 2018, which is a continuation-in-part of application No. PCT/US2017/021963, filed on Mar. 10, 2017, application No. 16/790,610 is a continuation-in-part of application No. 16/127,092, filed on Sep. 10, 2018, now Pat. No. 10,476,730, which is a continuation-in-part of application No. PCT/US2017/021957, filed on Mar. 10, 2017, application No. 16/790,610 is a continuation-in-part of application No. 16/125,748, filed on Sep. 9, 2018, now Pat. No. 10,833,912, which is a continuation-in-part of application No. PCT/US2017/015909, filed on Jan. 31, 2017, application No. 16/790,610 is a continuation-in-part of application No. 15/861,422, filed on Jan. 3, 2018, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/446,589, filed on Jun. 19, 2019, now Pat. No. 10,742,475, which is a continuation-in-part of application No. 15/326,112, filed on Jan. 13, 2017, which is a continuation-in-part of application No. PCT/US2015/041037, filed on Jul. 17, 2015, said application No. 16/446,589 is a continuation-in-part of application No. 15/584,052, filed on May 2, 2017, now Pat. No. 10,447,094, said application No. 16/446,589 is a continuation-in-part of application No. 15/434,813, filed on Feb. 16, 2017, now Pat. No. 10,129,862, and a continuation-in-part of application No. 16/127,151, filed on Sep. 10, 2018, and a continuation-in-part of application No. 16/127,092, filed on Sep. 10, 2018, now Pat. No. 10,476,730, which is a continuation-in-part of application No. PCT/US2017/021957, filed on Mar. 10, 2017, said application No. 16/446,589 is a continuation-in-part of application No. PCT/US2017/027131, filed on Apr. 12, 2017, and a continuation-in-part of application No. 15/384,217, filed on Dec. 19, 2016, now Pat. No. 10,440,705, and a continuation-in-part of application No. 16/125,748, filed on Sep. 9, 2018, now Pat. No. 10,833,912, and a continuation-in-part of application No. PCT/US2017/015909, filed on Jan. 31, 2017, and a continuation-in-part of application No. 15/861,422, filed on Jan. 3, 2018, and a continuation-in-part of application No. 16/060,710, filed as application No. PCT/US2016/066015 on Dec. 9, 2016, now Pat. No. 10,380,881, said application No. 16/446,589 is a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, which is a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/203,299, filed on Nov. 28, 2018, now Pat. No. 10,374,863, and a continuation-in-part of application No. 16/203,317, filed on Nov. 28, 2018, now Pat. No. 10,397,039, application No. 16/790,610 is a continuation-in-part of application No. 16/667,648, filed on Oct. 29, 2019, and a continuation-in-part of application No. 16/667,757, filed on Oct. 29, 2019.

(60) Provisional application No. 62/806,688, filed on Feb. 15, 2019, provisional application No. 62/806,694, filed on Feb. 15, 2019, provisional application No. 62/846,686, filed on May 12, 2019, provisional application No. 62/846,688, filed on May 12, 2019, provisional application No. 62/849,853, filed on May 18, 2019, provisional application No. 62/331,278, filed on May 3, 2016, provisional application No. 62/734,224, filed on Sep. 20, 2018, provisional application No. 61/744,093, filed on Sep. 18, 2012, provisional application No. 62/753,017, filed on Oct. 30, 2018, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019, provisional application No. 62/950,093, filed on Dec. 18, 2019.

(51) Int. Cl.
*G06V 40/10* (2022.01)
*H04W 4/029* (2018.01)

(58) Field of Classification Search
CPC . G06K 9/0053; G06K 9/00536; H04W 4/027; H04W 4/029; G06V 40/103; G06V 40/25
See application file for complete search history.

(56) References Cited

U.S. PATENT DOCUMENTS

| | | | |
|---|---|---|---|
| 2009/0102654 A1* | 4/2009 | Schoettle | G08B 13/2491 340/552 |
| 2009/0325723 A1* | 12/2009 | Edens | A63B 24/0021 473/223 |
| 2016/0231109 A1* | 8/2016 | Chang | G01C 22/006 |
| 2016/0277529 A1* | 9/2016 | Chen | H04L 67/306 |
| 2017/0074980 A1* | 3/2017 | Adib | G01S 7/35 |
| 2017/0365163 A1* | 12/2017 | MacKenzie | G01S 13/88 |
| 2019/0219668 A1* | 7/2019 | Shan | H04L 27/2607 |

OTHER PUBLICATIONS

Ma et al., "A Survey on Wi-Fi based Contactless Activity Recognition", Jan. 2016, IEEE, pp. 1086-1091 (Year: 2016).*

Liu et al., "Tracking Vital Signs During Sleep Leveraging Off-the-shelf WiFi", Jun. 2015, MobiHoc'15, pp. 267-276 (Year: 2015).*

Zhou et al., "On multipath link characterization and adaptation for device-free human detection", 2015, 2015 IEEE 35th International Conference on Distributed Computing Systems, pp. 389-398 (Year: 2015).*

Xu et al., "Attention-based Walking Gait and Direction Recognition in Wi-Fi Networks", Nov. 2018, arXiv (Year: 2018).*

* cited by examiner

METHOD, APPARATUS, AND SYSTEM FOR WIRELESS GAIT RECOGNITION

CROSS-REFERENCE TO RELATED APPLICATIONS

The present application hereby incorporates by reference the entirety of the disclosures of and claims priority to, each of the following cases:

(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS. SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  (1) Which is a continuation-in-part of PCT patent application PCT/US2017/021957, entitled "METHODS. APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(d) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS. DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(e) U.S. patent application Ser. No. 15/861,422, entitled "METHOD. APPARATUS, SERVER, AND SYSTEMS OF TIME-REVERSAL TECHNOLOGY", filed on Jan. 3, 2018,
(f) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(g) U.S. patent application Ser. No. 16/200,608, entitled "METHOD. APPARATUS, SERVER AND SYSTEM FOR VITAL SIGN DETECTION AND MONITORING", filed on Nov. 26, 2018,
(h) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(i) U.S. Provisional Patent application 62/806,688, entitled "METHOD, APPARATUS, AND SYSTEM FOR WIRELESS GAIT RECOGNITION", filed on Feb. 15, 2019,
(j) U.S. Provisional Patent application 62/806,694, entitled "METHOD, APPARATUS, AND SYSTEM FOR OUTDOOR TARGET TRACKING", filed on Feb. 15, 2019.
(k) U.S. Provisional Patent application 62/846,686, entitled "METHOD, APPARATUS, AND SYSTEM FOR WIRELESS INERTIAL MEASUREMENT", filed on May 12, 2019,
(l) U.S. Provisional Patent application 62/846,688, entitled "Method. Apparatus, and System for Processing and Presenting Life Log based on a Wireless Signal", filed on May 12, 2019,
(m) U.S. Provisional Patent application 62/849,853, entitled "Method, Apparatus, and System for Wireless Artificial Intelligent in Smart Car", filed on May 18, 2019,
(n) U.S. patent application Ser. No. 16/446,589, entitled "METHOD. APPARATUS, AND SYSTEM FOR OBJECT TRACKING AND SENSING USING BROADCASTING", filed on Jun. 19, 2019,
  (1) which is a Continuation-in-Part of U.S. patent application Ser. No. 15/326,112, entitled "WIRELESS POSITIONING SYSTEMS", filed on Jan. 13, 2017,
    a. which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  (2) which is a Continuation-in-Part of U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
    a. which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
  (3) which is a Continuation-in-Part of U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017, issued as U.S. Pat. No. 10,129,862 on Nov. 13, 2018,
  (4) which is a Continuation-in-Part of U.S. patent application Ser. No. 16/127,151, entitled "METHODS, APPARATUS, SERVERS, AND SYSTEMS FOR VITAL. SIGNS DETECTION AND MONITORING", filed on Sep. 10, 2018,
    a. which is a national stage entry of PCT patent application PCT/US2017/021963, entitled "METHODS, APPARATUS. SERVERS, AND SYSTEMS FOR VITAL SIGNS DETECTION AND MONITORING", filed on Mar. 10, 2017, published as WO2017/156492A1 on Sep. 14, 2017,
  (5) which is a Continuation-in-Part of U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  a. which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(6) which is a Continuation-in-Part of PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
(7) which is a Continuation-in-Part of U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
(8) which is a Continuation-in-Part of U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  a. which is a national stage entry of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(9) which is a Continuation-in-Part of U.S. patent application Ser. No. 15/861,422, entitled "METHOD, APPARATUS. SERVER, AND SYSTEMS OF TIME-REVERSAL TECHNOLOGY", filed on Jan. 3, 2018,
(10) which is a Continuation-in-Part of U.S. patent application Ser. No. 16/060,710, entitled "METHOD, APPARATUS, AND SYSTEMS FOR WIRELESS EVENT DETECTION AND MONITORING", filed on Jun. 8, 2018,
  a. which is a national stage entry of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,
(11) which is a Continuation-in-Part of U.S. patent application Ser. No. 15/873,806, entitled "METHOD, APPARATUS, AND SYSTEM FOR OBJECT TRACKING AND NAVIGATION", filed on Jan. 17, 2018, issued as U.S. Pat. No. 10,270,642 on Apr. 23, 2019,
(12) which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019,
(13) which claims priority to U.S. Provisional Patent application 62/734,224, entitled "METHOD, APPARATUS, AND SYSTEM FOR WIRELESS SLEEP MONITORING", filed on Sep. 20, 2018,
(14) which claims priority to U.S. Provisional Patent application 62/744,093, entitled "METHOD, APPARATUS, AND SYSTEM FOR WIRELESS PROXIMITY AND PRESENCE MONITORING", filed on Oct. 10, 2018,
(15) which claims priority to U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(16) which is a Continuation-in-Part of U.S. patent application Ser. No. 16/200,608, entitled "METHOD, APPARATUS, SERVER AND SYSTEM FOR VITAL SIGN DETECTION AND MONITORING", filed on Nov. 26, 2018,
(17) which is a Continuation-in-Part of U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(18) which is a Continuation-in-Part of U.S. patent application Ser. No. 16/203,299, entitled "APPARATUS, SYSTEMS AND METHODS FOR EVENT RECOGNITION BASED ON A WIRELESS SIGNAL", filed on Nov. 28, 2018,
(19) which is a Continuation-in-Part of U.S. patent application Ser. No. 16/203,317, entitled "APPARATUS, SYSTEMS AND METHODS FOR FALL-DOWN DETECTION BASED ON A WIRELESS SIGNAL", filed on Nov. 28, 2018,
(20) which claims priority to U.S. Provisional Patent application 62/806,688, entitled "METHOD, APPARATUS, AND SYSTEM FOR WIRELESS GAIT RECOGNITION", filed on Feb. 15, 2019,
(21) which claims priority to U.S. Provisional Patent application 62/806,694, entitled "METHOD, APPARATUS, AND SYSTEM FOR OUTDOOR TARGET TRACKING", filed on Feb. 15, 2019,
(22) which claims priority to U.S. Provisional Patent application 62/846,686, entitled "METHOD, APPARATUS, AND SYSTEM FOR WIRELESS INERTIAL MEASUREMENT", filed on May 12, 2019,
(23) which claims priority to U.S. Provisional Patent application 62/846,688, entitled "Method, Apparatus, and System for Processing and Presenting Life Log based on a Wireless Signal", filed on May 12, 2019,
(24) which claims priority to U.S. Provisional Patent application 62/849,853, entitled "Method. Apparatus, and System for Wireless Artificial Intelligent in Smart Car", filed on May 18, 2019.
(o) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(p) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(q) U.S. Provisional Patent application 62/900,565, entitled "QUALIFIED WIRELESS SENSING SYSTEM", filed on Sep. 15, 2019,
(r) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019, (s) U.S. patent application Ser. No. 16/667,648, entitled "METHOD. APPARATUS, AND SYSTEM FOR WIRELESS PROXIMITY AND PRESENCE MONITORING", filed on Oct. 29, 2019, (t) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019, (u) U.S. Provisional Patent application 62/950,093, entitled "METHOD, APPARATUS, AND SYSTEM FOR TARGET POSITIONING", filed on Dec. 18, 2019.

TECHNICAL FIELD

The present teaching generally relates to gait recognition. More specifically, the present teaching relates to identifying an object or an individual in an indoor environment by recognizing its rhythmic motion, e.g. a gait, based on wireless channel information.

BACKGROUND

Gait, an individual's way of walking, is increasingly perceived as not only an essential vital sign but also an effective biometric marker. On one hand, gait, in particular the walking speed, is considered as a valid and sensitive measure appropriate for monitoring and assessing functional decline and general health, leading to its designation as the sixth vital sign. Gait reflects both functional and physiological changes, and has been shown to be indicative and predictive of a number of health status, including mobility disability, response to rehabilitation, falls, and cognitive decline, etc. Progression of gait is related to clinically meaningful changes in life quality and health condition. Therefore, continuous monitoring of gait at home, rather than occasionally in-hospital clinical testing, is of great interest for individual's healthcare.

On the other hand, gait provides distinctive biometric features of an individual, underlying a promising way of human identification. As a complex functional activity, many factors influence one's gait, rendering it as a unique behavioral trait. Research has shown that gait recognition could be even more reliable than face recognition because there are tens of identifying characteristics entangled in gait, making it extremely difficult, if possible, to impersonate someone else's walking patterns. Compared with other human recognition systems, gait recognition is particularly attractive since it can operate remotely, passively, and non-intrusively, without any active cooperation of individuals.

Gait refers to the way or manner of walking (e.g. of a person with two feet, or an animal with two, four or multiple feet). Walking is a simple yet finely choreographed function, harmonizing many muscles over a complex bone and joint structure to deliver biomechanical locomotion. A person's gait cycle comprises two phases, the stance and swing phases, and further seven stages. The stance phase starts with the initial heel contact of one foot and ends when the same foot's toe leaves off the ground. The swing phase follows immediately with the action of the leg swinging forward and lasts until next heel contact.

For a 2-legged animals (e.g. human, or bird), the two feet may move with alternate motions. When the left foot touches the ground, the right foot may be swinging forward, and vice versa. For 4-legged animals (e.g. horse, cat, dog), in one gait, the front two legs (and/or the back two legs) may have alternate motions (e.g. when a horse trots). In another gait, the front two legs (and/or the back two legs) may touch the ground contemporaneously, or swing forward contemporaneously (e.g. when a horse gallops). For multi-legged creatures (e.g. caterpillar), the gait patterns may be even more complicated. For example, successive pairs of legs may move in coordinated manner (e.g. in wavefronts). The two legs in each pair may have varying degree of phase difference/lag.

Gait may serve as a vital sign as well as a biometric cue. Gait has been shown to reflect health and functional status and can be indicative and predictive of a number of health status including mobility disability, response to rehabilitation, falls, and cognitive decline, etc. Progression of gait is related to clinically meaningful changes in life quality and health condition. Therefore, continuous monitoring of gait at home, rather than occasional in-hospital clinical testing, is of great interest for the well-being and health care of individuals, especially for care-givers (e.g. spouse, children, relatives, friends, long term care provider). Gait speed, also often termed walking speed, is the most important information being measured and concerned for healthcare. It has been recommended as a pragmatic and essential clinical indicator of well-being.

There are some existing non-wireless gait measurement and recognition systems based on cameras, floor sensors, and/or wearable sensors (e.g. accelerometer) to capture gait-related information. There are some disadvantages of the existing non-wireless systems. First, typically in these systems, the target subjects (e.g. the person) must cooperate, e.g. walk in a particular direction, in a designated path, or in a certain manner. Second, only certain restricted areas can be monitored by the existing non-wireless systems, e.g. an instrumented walkway with floor sensors installed in/under a floor mat, or an area covered by an installed cameras. The restricted area is very small and must be within a short distance in line-of-sight (LOS) of the instruments. Such systems are thus not suitable for unrestricted areas in daily usage (e.g. the person's home, or a mall, or a station, or an elderly care facility). They are not convenient and/or comfortable enough for ubiquitous applications in smart homes and smart buildings Third, the equipment may be too expensive and the installation may be too labor intensive if the areas are to be instrumented for gait monitoring using the existing systems. Fourth, camera systems cause privacy problems to users. Fifth, floor sensors require significant installation effort and hardware cost. Sixth, wearables are useless if the person forgets or avoids wearing them to be monitored.

There are some existing wireless gait monitoring systems based on Doppler effect and radar. Disadvantages of existing wireless/RF based systems include: (a) some system needs specialized hardware which are expensive and hard to maintain; (b) some system requires very large bandwidth; (c) some requires special phased antennas; (d) Doppler-based systems reflect only partial speed projected on a specific direction rather than the entire speed; (e) Doppler-based system can only operate in a narrow LOS area (typically within 4 to 5 meters); (f) some systems measure features that are only remotely related to gait; (g) the features may be location/venue dependent, i.e. they may work in one venue, but not in another venue, thus requiring retraining for every different location.

SUMMARY

The present teaching generally relates to a system for monitoring rhythmic motions like a gait. In one embodiment, the present teaching relates to a system for monitoring gait based on wireless signals and channel information of a wireless multipath channel that is impacted by the gait motion. The system may also recognize the gait, to identify and verify an individual accordingly.

In one embodiment, a system for rhythmic motion monitoring is described. The system comprises: a transmitter, a receiver, and a processor. The transmitter is configured for transmitting a first wireless signal towards an object in a venue through a wireless multipath channel of the venue. The receiver is configured for: receiving a second wireless signal through the wireless multipath channel between the transmitter and the receiver. The second wireless signal differs from the first wireless signal due to the wireless multipath channel which is impacted by a rhythmic motion of the object. The processor is configured for: obtaining a time series of channel information (CI) of the wireless multipath channel based on the second wireless signal, monitoring the rhythmic motion of the object based on the time series of CI (TSCI), and triggering a response action based on a result of the monitoring. According to various embodiments, the processor may be physically coupled to at least one of the transmitter and the receiver.

In another embodiment, a described apparatus for rhythmic motion monitoring is in a venue where a transmitter and a receiver are located. The described apparatus comprises, a processor and at least one of the transmitter and the receiver. The transmitter is configured for transmitting a first wireless signal through a wireless multipath channel of the venue. The receiver is configured for receiving a second wireless signal through the wireless multipath channel. The second wireless signal differs from the first wireless signal due to the wireless multipath channel which is impacted by a rhythmic motion of an object in the venue. The processor is configured for: obtaining a time series of channel information (CI) of the wireless multipath channel based on the second wireless signal, monitoring the rhythmic motion of the object based on the time series of CI (TSCI), and triggering a response action based on a result of the monitoring.

In one embodiment, the apparatus includes the receiver but not the transmitter. The receiver receives the second wireless signal and extracts the CI, e.g. a channel state information (CSI), for performing the rhythmic motion monitoring. In another embodiment, the apparatus includes the transmitter but not the receiver. The CSI is extracted by the receiver and obtained by the processor for rhythmic motion monitoring. In still another embodiment, the apparatus includes the transmitter but not the receiver. The CSI is extracted at the receiver that sends the CSI to the transmitter. The rhythmic motion monitoring is performed at the transmitter.

In a different embodiment, a method, implemented by a processor, a memory communicatively coupled with the processor, and a set of instructions stored in the memory to be executed by the processor, is described. The method comprises: obtaining a time series of channel information (CI) of a wireless multipath channel of a venue. A transmitter transmits a first wireless signal towards an object in a venue through the wireless multipath channel of the venue. A receiver receives a second wireless signal through the wireless multipath channel and computes the time series of CI (TSCI) of the wireless multipath channel based on the second wireless signal. The second wireless signal differs from the first wireless signal due to the wireless multipath channel which is impacted by a rhythmic motion of the object in the venue. The method further comprises: monitoring the rhythmic motion of the object based on the TSCI; and triggering a response action based on a result of the monitoring.

Other concepts relate to software for implementing the present teaching on wireless rhythmic motion monitoring in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1A:
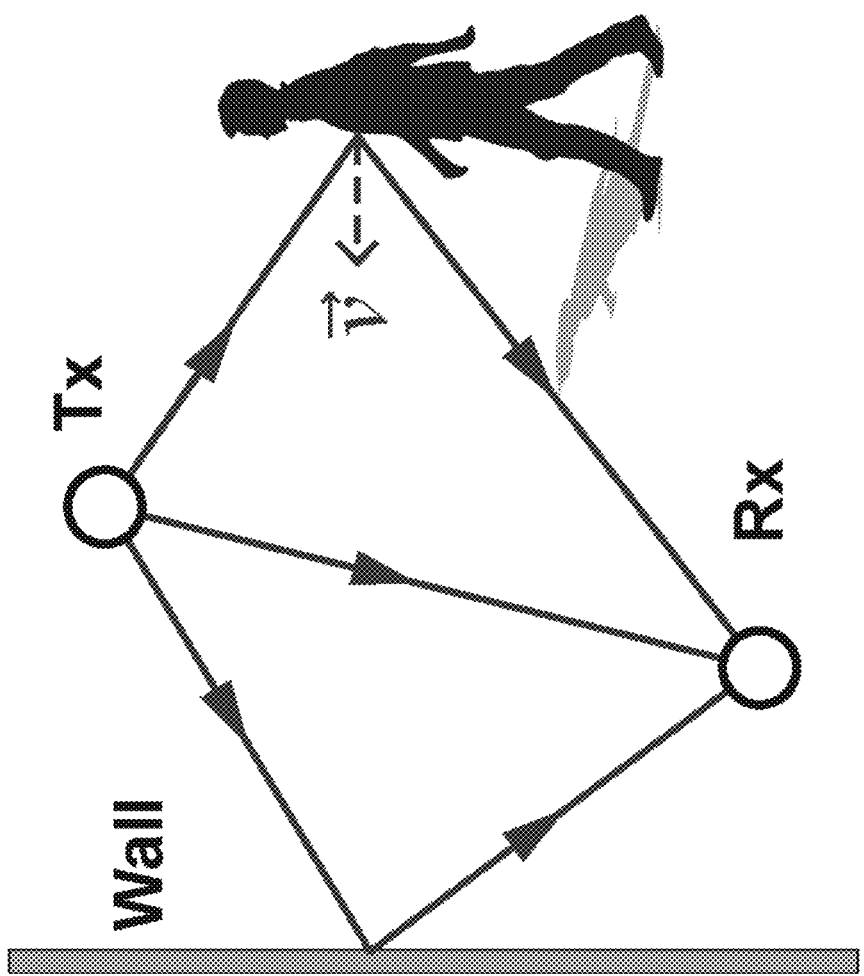
FIG. 1A illustrates an exemplary multipath model in rich-scattering indoor environments, where an object (e.g., a human body) is simplified as a single reflector producing only one major reflection path.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE. IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beaconipilot/probe/enquiryiacknowledgementfhandshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise, a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame. CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal A probe signal may be formatted according to a wireless network standard (e.g. WiFi), a cellular network standard (e.g. LTE/5G/6G), or another standard. A probe signal may comprise a packet with a header and a payload A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold, (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying) A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID), SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/ locations/movements/activities Labels/tags may be generated for the clusters. The clusters may be stored and retrieved. The classifier may be applied to associate the current TSCI (or characteristics/STI or the other analytics/ output response, perhaps associated with a current event) with, a cluster, a known/specific event, a class/category/ group/grouping/list/cluster/set of known events/subjects/locations/movements/activities, an unknown event, a class/ category/group/grouping/list/cluster/set of unknown events/ subjects/locations/movements/activities, and/or another event/subject/location/movement/activity/class/category/ group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps. (t) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1-D1, wherein D1 is a pre-determined positive quantity (e.g. a constant time offset). (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically, T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, $abs(X^a-Y^b)$, $(X-Y)^a$, (X/Y), (X+a)/(Y+b), $(X^a/Y^b)$, and $((X/Y)^a-b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y. (X/Y) will be smaller than 1 and the function will be negative. In another example, both arguments X and Y may be n-tuples such that $X=(x\_1, x\_2, \ldots, x\_n)$ and $Y=(y\_1, y\_2, \ldots, y\_n)$ The function may be a function of at least one of: $x\_i$, $y\_i$, $(x\_i-y\_i)$, $(y\_i-x\_i)$, $abs(x\_i-y\_i)$, $x\_i\hat{\ }a$, $y\_i\hat{\ }b$, $abs(x\_i\hat{\ }a-y\_i\hat{\ }b)$, $(x\_i-y\_i)\hat{\ }a$, $(x\_i/y\_i)$, $(x\_i+a)/(y\_i+b)$, $(x\_i\hat{\ }a/y\_i\hat{\ }b)$, and $((x\_i/y\_i)\hat{\ }a-b)$, wherein i is a component index of the n-tuple X and Y. and $1 \le i \le n$. E.g. component index of $x\_1$ is $i=1$, component index of $x\_2$ is $i=2$ The function may comprise a component-by-component summation of another function of at least one of the following: $x\_i$, $y\_i$, $(x\_i-y\_i)$, $(y\_i-x\_i)$, $abs(x\_i-y\_i)$, $x\_i\hat{\ }a$, $y\_i\hat{\ }b$, $abs(x\_i\hat{\ }a-y\_i\hat{\ }b)$, $(x\_i-y\_i)\hat{\ }a$, $(x\_i/y\_i)$, $(x\_i+a)/(y\_i+b)$, $(x\_i\hat{\ }a/y\_i\hat{\ }b)$, and $((x\_i/y\_i)\hat{\ }a-b)$, wherein i is the component index of the n-tuple X and Y. For example, the function may be in a form of $sum\_\{i=1\}\hat{\ }n\ (abs(x\_i/y\_i)-1)/n$, or $sum\_\{i=1\}\hat{\ }n\ w\_i*(abs(x\_i/y\_i)-1)$, where $w\_i$ is some weight for component i.

The map may be computed using dynamic time warping (DTW). The DTW may comprise a constraint on at least one of the map, the items of the first TSCI the items of the second TSCI, the first time duration, the second time duration, the first section, and/or the second section. Suppose in the map, the $i\hat{\ }\{th\}$ domain item is mapped to the $j\hat{\ }\{th\}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning unsupervised learning, self-organizing maps, auto-encoder, neural network, deep neural network, and/or yet another method. The classifier of the at least one event may be re-trained based on at least one of the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier Channel/Channel Information/Venue/Spatial-Temporal Info/Motion/Object The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information, transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of, a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device Each CI may be associated with an antenna of the Type 1 device and an antenna of the Type 2 device.

The CI may be obtained from a communication hardware (e.g. of Type 2 device, or Type 1 device) that is capable of providing the CI The communication hardware may be a WiFi-capable chip/IC (integrated circuit), chip compliant with a 802.11 or 802.16 or another wireless/radio standard, next generation WiFi-capable chip. LTE-capable chip, 5G-capable chip, 6G/7G/8G-capable chip, Bluetooth-enabled chip, NFC (near field communication)-enabled chip. BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform) The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BILE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise, location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/ location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score. Euclidean distance, weighted distance. $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction) A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be, a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (II)). The II) may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/ other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/ display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/ tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/ audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/ bucket/container, smart plate/cup/bowl/pot/mat/utensils/ kitchen tools/kitchen devices/kitchen accessories/cabinets/ tables/chairs/tiles/lights/water pipes/taps/gas range/oven/ dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line). IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.1 lay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory. CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.)

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, post-processing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform. Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing Operations may be applied jointly on multiple time series or functions.

The function (e.g. function of operands) may comprise, scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform. Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function. Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified Some quantity (e.g. spatial-temporal information of the object) may be determined based on the at least one argument of the function.

A characteristics (e.g. characteristics of motion of an object in the venue) may comprise at least one of an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/ state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/ STI/size/property/trait/habit/behavior, the venue, feature/ fixture/furniture/barrier/material/machine/living thing/ thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds, the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas, stretches/expanse such as bedroom, living room, storage room, walkway, kitchen, dining room, foyer, garage, first floor, second floor, rest room, offices, conference room, reception area, various office areas, various warehouse regions, various facility areas, etc.

The segments/regions/areas may be presented in a map/model Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.) If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI. CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system. HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices. FDMA devices, CDMA devices, WCDMA devices, TD-SCDMA devices, gaming devices, eyeglasses, glass panels. VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of, monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical U I/display, device with wireless transceiver, device with wireless transmitter, device with wireless receiver, internet-of-thing (IoT) device, device with wireless network, device with both wired networking and wireless networking capability, device with wireless integrated circuit (IC). Wi-Fi device, device with Wi-Fi chip (e.g. 802.11a/b/g/n/ac/ax standard compliant), Wi-Fi access point (AP), Wi-Fi client, Wi-Fi router. Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC). LTE chip. BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

The present teaching discloses systems for monitoring rhythmic motions like gait based on wireless signals and channel information of a wireless multipath channel that is impacted by the gait motion. The systems may also recognize the gait, to identify and verify an individual accordingly.

Gait recognition is particularly appealing for a range of ubiquitous applications that need human identification since it can be achieved at a distance without any active user cooperation. For example, a smart building would automatically open the door for an authorized user when she walks in. A smart home would personalize the temperature and ambient light for a recognized user. A smart TV therein would react with her favorite programs. Smart home devices like Google Home and Amazon Alexa could directly interact with her in a more friendly way. For all of these to function, the user needs to do nothing but walk habitually inside the space. An easy-to-deploy and convenient system, however, is demanded for continuous and passive gait recognition.

Traditional gait measurement and recognition systems usually rely on cameras, floor sensors, and/or wearables to capture gait information. The target subjects have to either walk within restricted areas (typically only an instrumented walkway) or wear body sensors (e.g., accelerometers). Therefore, they are mainly limited to research and clinical usage, and are not convenient and comfortable enough for ubiquitous applications in smart homes and smart buildings. Recently, a new type of gait recognition using wireless signals is on the horizon. Radio signals (e.g., WiFi) are everywhere and can penetrate obstacles like walls and furniture, underpinning the potential of through-the-wall gait sensing. Existing approaches, however, require subjects to walk on a predefined path in a predefined direction Hence they are only suitable for confined areas (e.g., a 5-meter corridor-like narrow path) with a strong Line-Of-Sight (LOS) condition. Moreover, most of existing works do not physically measure gait. They merely extract RF-based features that are supposed to be representative of walking patterns, making them location and environment dependent since those RF features are usually entangled with the surrounding environments. Most importantly, none of these systems can work for Non-LOS (NLOS) scenarios, not to mention through-the-wall sensing.

A wireless/RF based system disclosed in the present teaching can achieve many benefits: e.g., (a) the disclosed system can operate in both LOS and non-line-of-sight (NLOS) conditions; (b) the disclosed system does not require the monitored person to cooperate (i.e. the person is free to walk in any manner he wants); (c) the disclosed system uses common off-the-shelf (COTS) components and thus is less expensive; (d) each device used in the disclosed system can cover a large area; (e) the disclosed system can be installed easily; (f) the disclosed system does not need a camera to intrude into privacy, (g) the disclosed system does not have a wearable device for the person to wear; and (h) the disclosed system is location independent.

One goal of the disclosed system is to obtain features computable from channel state information (CSI) that are good for recognition/verification while imposing little constraint on the person to be monitored. e.g. no wearable and no constraint on the way the person walk. In general, the disclosed system can monitor a rhythmic motion of an object based on time series of CI. For example, breathing is periodic and rhythmic. Gait is somewhat periodic, but different gait cycles can be different. A "step" phase corresponding to the left foot touching the ground can be different from the "step" phase corresponding to the right foot. The asymmetry between the left step and the right step (e.g. when one leg is wounded) is an important feature to assess a lot of health related issues. Thus, a gait motion is called rhythmic, instead of periodic, as it is indeed generated in a rhythmic manner, with underlying alternate motion of the left foot and the right foot. The disclosed systems and methods in the present teaching can be applied to any rhythmic motion, although gait is used as an example of rhythmic motion for illustration below.

The Type 1 device and/or Type 2 device (together with the wireless signal, TSCI, processor, memory, set of instructions) can be used to monitor other kinds of motion as well, such as transient motion (e.g. fall down, gesture, writing, body motion, people movement, vehicle motion, in-vehicle activities).

The Type 1 device and/or the Type 2 device may be a standalone device, or an embedded device. It may be connected to another system (for power, signaling, network access, etc.) using a connector/port such as USB (e.g. Type A/B/CI)/E, micro-USB, mini-USB, etc.), Thunderbolt, Firewire, Lightning (e.g. in Apple devices such as iPhone, iPad, AirPods, etc.), OBD (on-board-diagnostic port), cigarette lighter port (e.g. 12V), PCI (e.g. PCI, PCI Express, etc.), VGA, DVI, HDMI, parallel port, serial port, ADAT, BNC, D-SUB, F, MIDI, UHF, MCX, N, PS/2, RCA, SATA, S-video, SATA, mSATA, m.2, SMA, SMB, SMC, S/PDIF, RJ-1, RJ-45, SCSI, TNC, TS, TRS, UHF, mini-UHF, XLR, coaxial, optical, Ethernet, display port, etc.

Any device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, inverter, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. after-market device) plugged into a port in the vehicle (e.g. OBD port/socket. USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle) The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable. Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall. The Type A device may be located, tracked or monitored based on the TSCI.

In one embodiment, a scattering multipath model is considered to derive a statistical approach on top of the scattering model for passive speed estimation, which can capture speed when a target is up to 10 meters away from the link, and/or behind the walls. The proposed model offers new directions and opportunities for indoor wireless sensing. Moreover, a gait recognition system, called "GaitWay" is built based on walking speed alone. By extracting a range of physical plausible features, GaitWay can recognize a subject's gait independently from location, orientation, environments, and the user's apparel.

Given numerous multipaths, the disclosed system can statistically investigate the channel properties by accounting for all multipaths together based on a disclosed method. The target's moving speed can be calculated from the ACF of CSI. Built upon the statistical property of numerous multipaths, the disclosed method is independent of the environments, locations, and user orientations. The disclosed method automatically detects stable period during a user's normal activities. The disclosed system can use the ACF of the speed to measure such walking periodicity. The disclosed system can estimate the gait cycle time, and segment the speed series for every individual step. To monitor and assess a subject's gait, the disclosed system can investigate three straight-forward properties, i.e., average walking speed, gait cycle time, and stride length. In addition, the disclosed system can also adopt a measure for stability and symmetry, e.g., harmonic ratio, to evaluate gait progression. The disclosed system can leverage Support Vector Machine (SVM) to recognize different gaits based on features extracted from speed estimation, including speed, acceleration, symmetry, rhythmicity and cadence, smoothness, recurrent quantification analysis and ACF features.

A 2-legged animal (e.g. a person) would have two step segments for one gait cycle. For example, a first step segment may correspond to forward movement of left foot, and a second step segment may correspond to forward movement of right foot. A 4-legged animal (e.g. a dog) would have 4 step segments for one gait cycle. Each step segment may correspond to a movement of each foot. The step segments may have different duration.

Figure 1B:
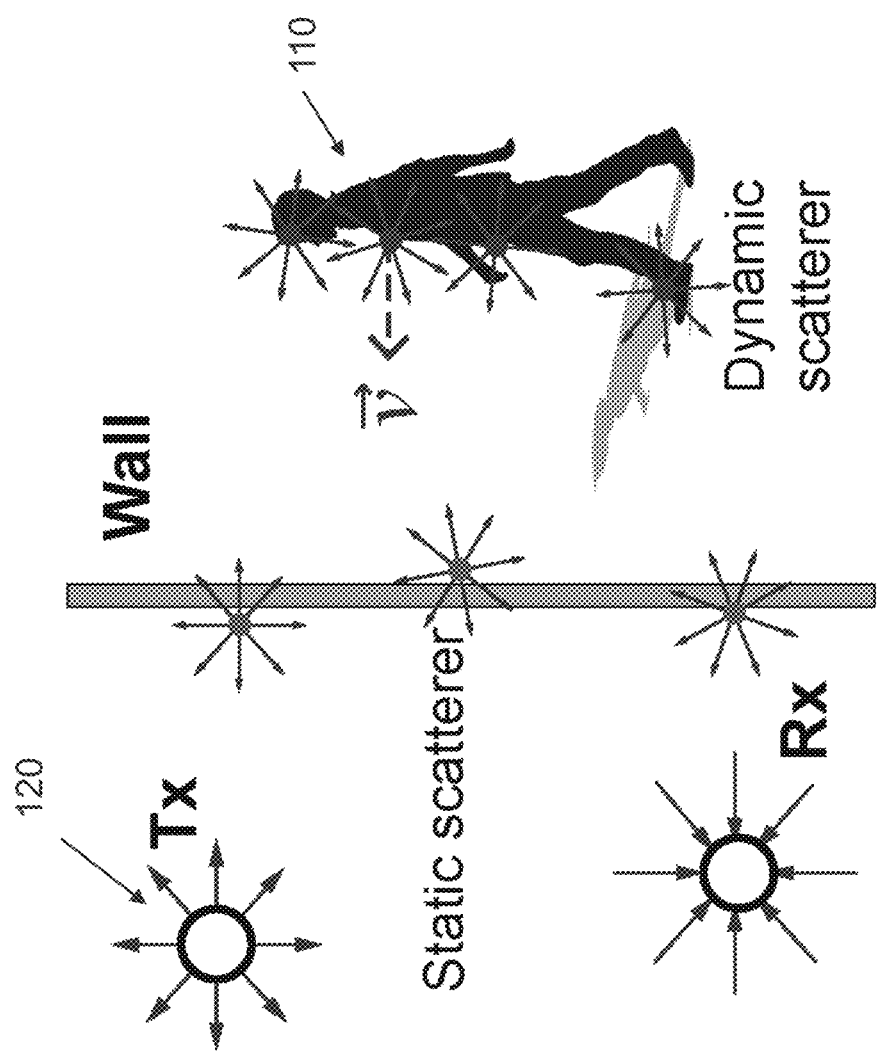
FIG. 1B illustrates another exemplary multipath model in rich-scattering indoor environments, where an object scatters the signal and produce multiple paths, according to some embodiments of the present teaching.

The disclosed system can investigate a distinct rich scattering multipath model to apply the disclosed method. Instead of simplifying an object (e.g., a human body) as a single reflector producing only one major reflection path in a model Doppler Frequency Shift (DFS) as shown in FIG. 1A, FIG. 1B illustrates an exemplary multipath model in rich-scattering indoor environments, where an object scatters the signal and produce multiple paths, according to some embodiments of the present teaching. As shown in FIG. 1B, the human body 110 is seen as multiple scatterers, which reflect signals in diverse directions and superimpose at the Tx 120 together with signals scattered by other objects from any directions. Given numerous multipaths, rather than geometrically analyzing a specific reflection path or assuming a dominant one with others ignored, the disclosed system can statistically investigate the channel properties by accounting for all multipaths together. It turns out that the target's moving speed can be calculated from the ACF of CSI. Built upon the statistical property of numerous multipaths, the disclosed method is independent of the environments, locations, and user orientations. In contrast to previous reflection model that fails in rich multipath environments, the proposed model works even better with more multipaths and supports through-the-wall sensing.

The disclosed system can also track speed through the walls. Consider a wireless transmission pair each equipped with omni-directional antennas. The channel frequency response (CFR), also called the channel state information (CSI), for the multipath channel at time t may be generally modeled as $$H(t,f)=\Sigma_{l\in\Omega}a_l(t)\exp(-j2\pi\tau_l(t)), \quad (1)$$

where al(t) and τl(t) denote the complex amplitude and propagation delay of the l-th multipath component (MPC), respectively, and Ω stands for the set of MPCs.

Due to the timing and frequency synchronization offsets and additive thermal noise, the real measurement of CFR H˜(t,f) is expressed as $$\tilde{H}(t,f)=\exp(-j(\alpha(t)+\beta(t)f))H(t,f)+n(t,f), \quad (2)$$

where α(t) and β(t) are the random initial and linear phase distortions at time t, respectively.

The radio signals are scattered by numerous scatterers, such as walls, ceilings, floors, furniture, human bodies, etc. Due to the superposition principal of EM waves, the CSI H(t,f) can be decomposed as $$H(t,f)=\Sigma_{i\in\Omega_s(t)}H_i(t,f)+\Sigma_{j\in\Omega_d(t)}H_j(t,f)+\epsilon(t,f), \quad (3)$$

where $\Omega_s(t)$ denotes the set of static scatterers, $\Omega_d(t)$ denotes the set of dynamic scatterers, and Hi(t,f) stands for the part contributed by the i-th scatterer. ε(t,f) is the noise term, which can be approximated as additive white Gaussian noise (AWGN) with variance $\sigma^2(f)$ and is statistically independent of Hi(t,f). The intuition behind the decomposition is that each scatterer can be treated as a "virtual Tx" diffusing the received EM waves in all directions and then these EM waves add up together at the receive antenna after bouncing off the interior objects indoors. As a result, H(t,f) actually measures the sum of the electric fields of all the incoming EM waves. In practice, within a sufficiently short period, it is reasonable to assume that both the sets $\Omega_s(t)$ and $\Omega_d(t)$ change slowly in time and they can be approximated as time-invariant sets.

One can consider a 2-D scattering model, where all the scatterers are within the same horizontal plane. Due to the channel reciprocity, EM waves traveling in both directions will undergo the same physical perturbations (i.e., reflection, refraction, diffraction, etc.). Therefore, if the receiver were transmitting EM waves, the CSI "measured" at the i-th scatterer or "virtual Tx" would be identical to Hi(t,f). If the speed of the i-th scatterer is vi, then a continuous limit representation of Hi(t,f) can be expressed as $$H_i(t,f)=\int_0^{2\pi}F_i(\theta,f)\exp(-jkv_i\cos(\theta)t)d\theta, \quad (4)$$

where Fi(θ,f) denotes the complex channel gain of the MPC from direction θ for the i-th scatterer, and $$k=\frac{2\pi}{\lambda}$$

is the wave number where λ is the wavelength.

Based on the statistical theory of EM fields developed for reverberation cavities, which approximates indoor environments well, Fi(θ,f), for ∀i, can be represented as a random variable with the following properties: for ∀θ, Fi(θ,f) is a circularly-symmetric Gaussian random variable with the same variance σF2 (t); for ∀θ1=θ2, Fi(θ1,f) and Fi(θ2,f) are statistically independent; for ∀i/=j∈ Ωd, Fi(θ1,f) and Fj(θ2, f) are statistically independent for ∀θ1 and ∀θ2.

With the above properties, now one can investigate how the ACF of CSI relates to the speed vi. The mean of Hi(t,f) equals to zero, i.e., E[Hi(t,f)]=0, where E[•] denotes the expectation operator. Then, the covariance of two CSIs with time lag τ can be written as $$\text{Cov}[H_i(t,f), H_i(t+\tau,f)] = \mathbb{E}[H_i(t,f)H_i^*(t+\tau,f)] = 2\pi\sigma_{F_i}^2(f) J_0(kv_i\tau), \quad (5)$$

where $J_0(\cdot)$ is the 0th-order Bessel function of the first kind 46|:

$$J_0(x) = \frac{1}{2\pi}\int_0^{2\pi} \exp(-jx\cos(\theta))d\theta.$$

The ACF of Hi(t,f) with time lag τ, denoted as $\rho_{H_i}(\tau,f)$, is derived as $$\rho_{H_i}(\tau, f) = \frac{\text{Cov}[H_i(t, f), H_i(t + \tau, f)]}{\text{Cov}[H_i(t, f), H_i(t, f)]} = J_0(kv_i\tau). \quad (6)$$

Similarly, the ACF of the CSI H(t,f) with time lag τ, denoted as $\rho_H(\tau,f)$, can be obtained as $$\rho_H(\tau, f) = \frac{\sum_{i\in\Omega_d}\sigma_{F_i}^2(f)J_0(kv_i\tau) + \sigma^2(f)\delta(\tau)}{\sum_{i\in\Omega_d}\sigma_{F_i}^2(f) + \sigma^2(f)}, \quad (7)$$

where δ(•) is the Dirac's delta function. As seen, $\rho_H(\tau,f)$ is a linear combination of the ACF of Hi(t,f) and the weight of each term equals to the energy scattered by that corresponding scatterer.

Consider that there is only one person moving in the monitored area. The speed of all the scatterers can be approximated to be the same, i.e., vi=v, for ∀i∈ Ωd.

Then, $\rho_H(\tau,f)$ can be simplified as $$\rho_H(\tau, f) = \frac{\sum_{i\in\Omega_d}\sigma_{F_i}^2(f) + \sigma^2(f)\delta(\tau)}{\sum_{i\in\Omega_d}\sigma_{F_i}^2(f) + \sigma^2(f)}J_0(kv\tau) \stackrel{\Delta}{=} \alpha(f)J_0(kv\tau), \quad (8)$$

where α(f) is defined as the gain of each subcarrier f. Equation (8) bridges the moving speed of human body and the second order statistics, i.e., ACF, of CSI.

In practice, the sample ACF is used instead, which is an estimate of the ACF, and one can use n(τ,f) to stand for the estimation noise of the ACF, i.e., $$\hat{\rho}_H(\tau,f) = \alpha(f)J_0(kv\tau) + n(\tau,f). \quad (9)$$

Since the term $J_0(kv\tau)$ in (9) is a function of moving speed v, it is called the speed signal in the following. From (9), one can derive the moving speed v from the ACF measurement $\hat{\rho}_H(\tau,f)$. In practice, however, the signal-to-noise ratio (SNR) of the speed signal on each subcarrier modulated by human movement can be very low, especially when the person being monitored is far away from the link or behind walls. As a second-order statistic, ACF circumvents the phase issue and is synchronized over all subcarriers, allowing direct combination of ACF measured on different subcarriers. In the following, a novel scheme is proposed based on Maximal Ratio Combining (MRC) that combines the speed signals measured on multiple subcarriers in an optimal way such that the SNR of the speed signal is maximized. MRC is a diversity combining method in telecommunications that optimizes SNR by combining signals received on multiple antennas and is applicable here by treating subcarriers as receiving diversity.

When α(f) is small, i.e., H(t,f) is dominated by the white noise, each tap of the ACF follows a zero-mean normal distribution with equal variance 1/N, i.e., n(τ,f)~ $\mathcal{N}$ (0,1/N), where N is the number of samples used in the ACF estimation. Therefore, the variance of n(τ,f) in (9) is the same for different subcarriers. Considering the fact that the noise terms of different subcarriers are statistically independent, it can be shown that the MRC scheme achieves the maximum of the SNR of the speed signal $J_0(kv\tau)$, i.e., $$S(\tau) = \Sigma_{f\in\mathcal{F}} w^*(f)\hat{\rho}_H(\tau,f) = (\Sigma_{f\in\mathcal{F}} w^*(f)\alpha(f))J_0(kv\tau) + \Sigma_{f\in\mathcal{F}} w^*(f)n(\tau,f), \quad (10)$$

where S(τ) is called the combined speed signal, w*(f) denotes the optimal combining weight for subcarrier f, and w*(f) is linearly proportional to the gain α(f).

The gain α(f) on each subcarrier, however, is not directly available from CSI. Fortunately, since $J_0(kv\tau)$ is continuous at time lag 0, i.e., $\lim_{\tau\to 0}J_0(kv\tau)=1$, one can have $\alpha(f)=\lim_{\tau\to 0}\rho_H(\tau,f)$ according to (8). Therefore, when the channel sampling rate Fs is sufficiently high, α(f) can be estimated as the quantity $\hat{\rho}_H(\tau=1/F_s,f)$, the first tap of the ACF, and w*(f) becomes $$\hat{w}^*(f) = \hat{\rho}_H(\tau=1/F_s,f). \quad (11)$$

The intuition that MRC maximizes the SNR is that, when combining all subcarriers appropriately, the "good" subcarriers will boost the signal while the "bad" subcarriers will help attenuate the noise since their noise terms are independent.

Figure 2A:
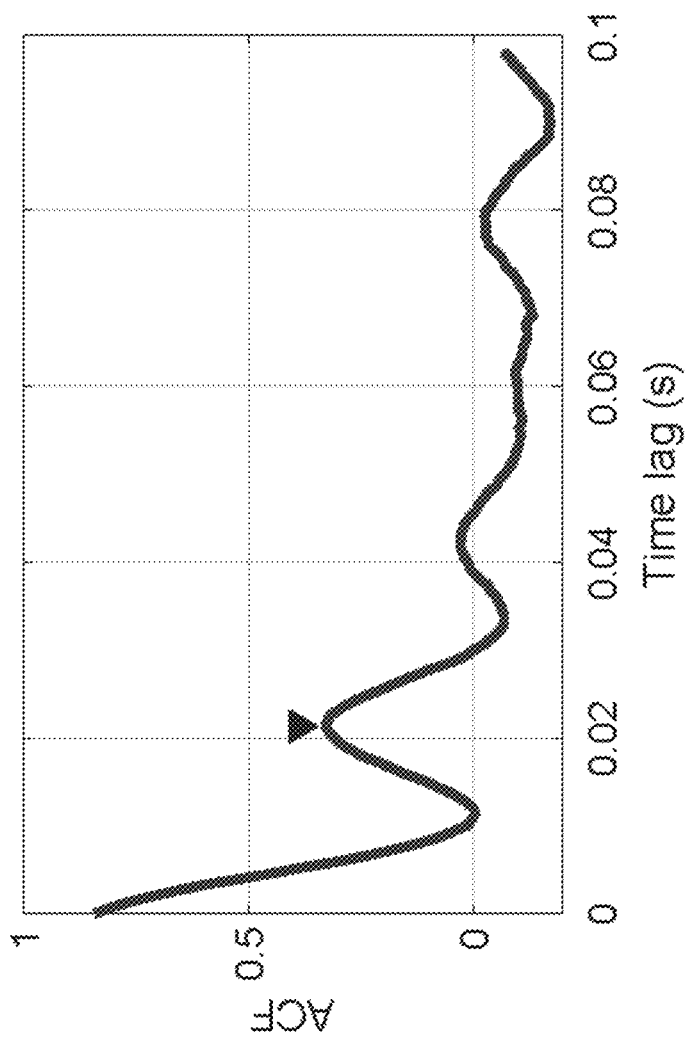
FIG. 2A illustrates an example of a combined speed signal, according to some embodiments of the present teaching.
Figure 2B:
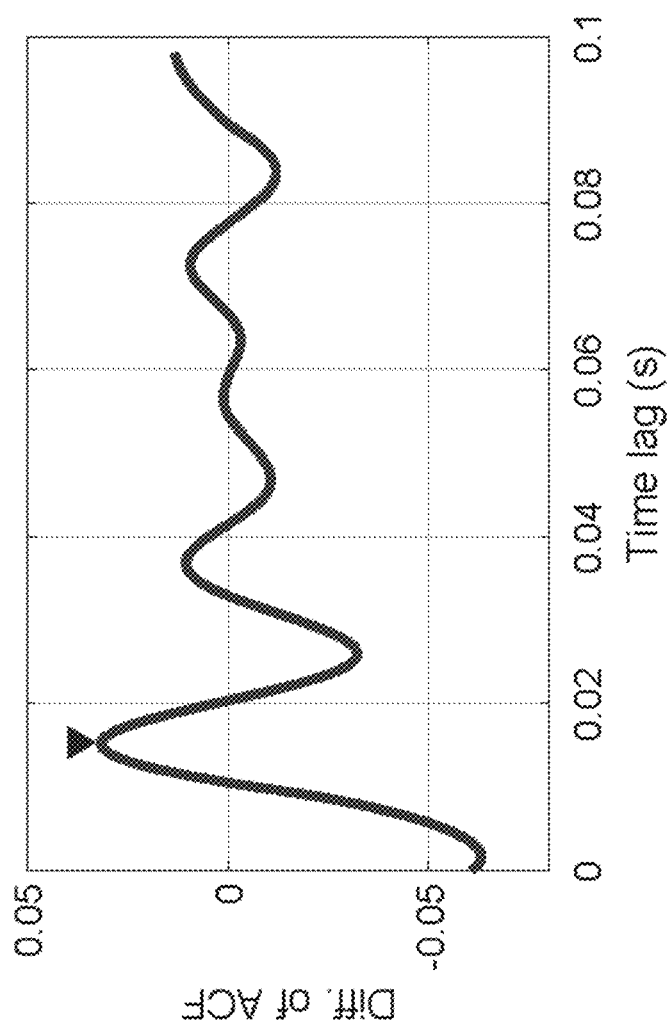
FIG. 2B illustrates an example of a difference of a combined speed signal, according to some embodiments of the present teaching.
Figure 2C:
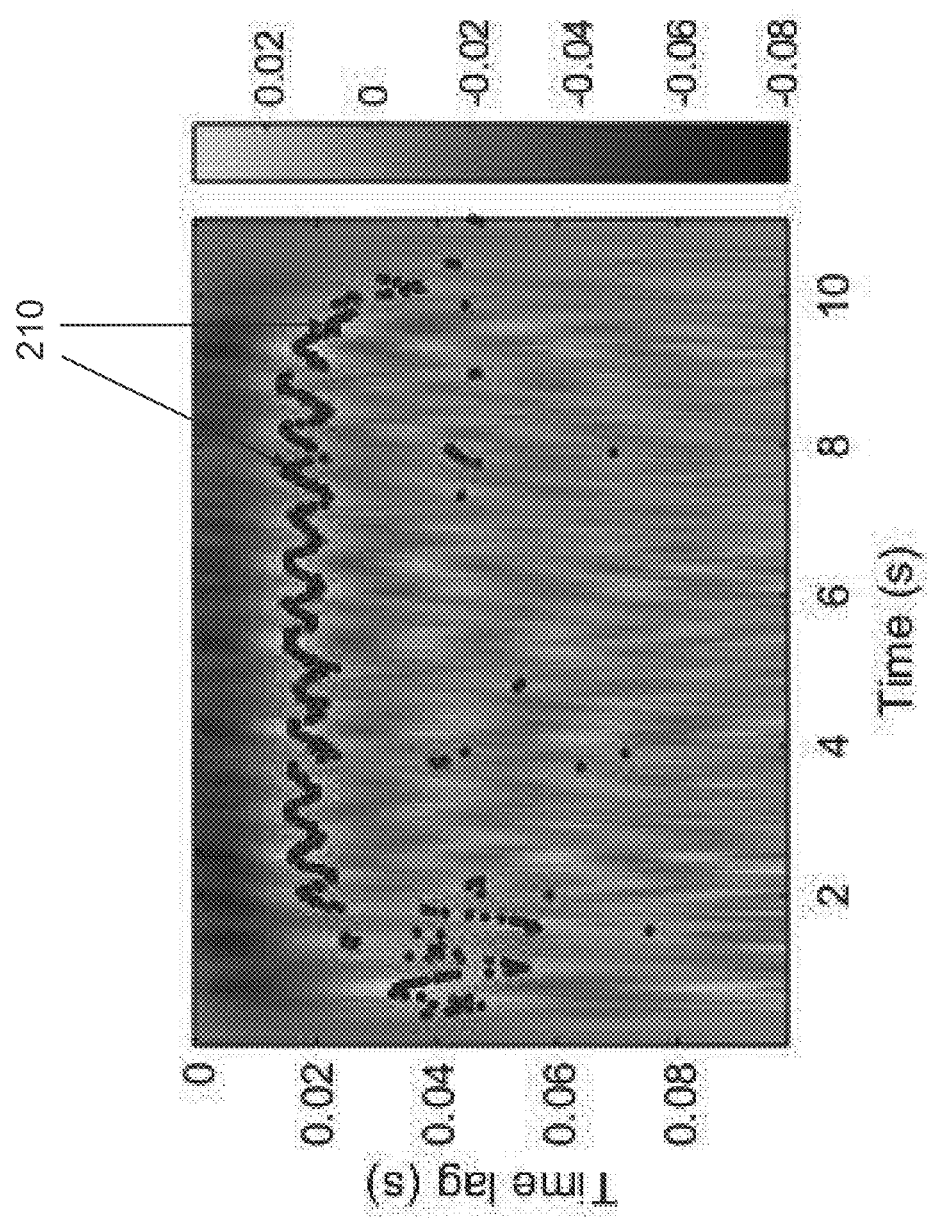
FIG. 2C illustrates an exemplary matrix of combined speed signals, according to some embodiments of the present teaching.

FIG. 2A shows an example of the combined speed signal, and FIG. 2C shows the matrix of the combined speed signal, where each column of the matrix corresponds to a combined speed signal. As shown in FIG. 2A, the shape of the combined speed signal resembles the Bessel function J0(x) with x=kvτ, and the speed v can be extracted by matching their key characteristics, e.g., the locations of the first peak or valley. One can use the first peak in one embodiment of GaitWay, i.e., the speed is calculated as $$\hat{v} = \frac{x_0}{k\hat{\tau}} = \frac{x_0\lambda}{2\pi\hat{\tau}}, \quad (12)$$

where $x_0$ is constant value corresponding to the first peak of Bessel function J0(x), and $\hat{\tau}$ is the time lag corresponding to the first peak in the combined speed signal, as marked by the dots 210 in FIG. 2C.

Figure 2D:
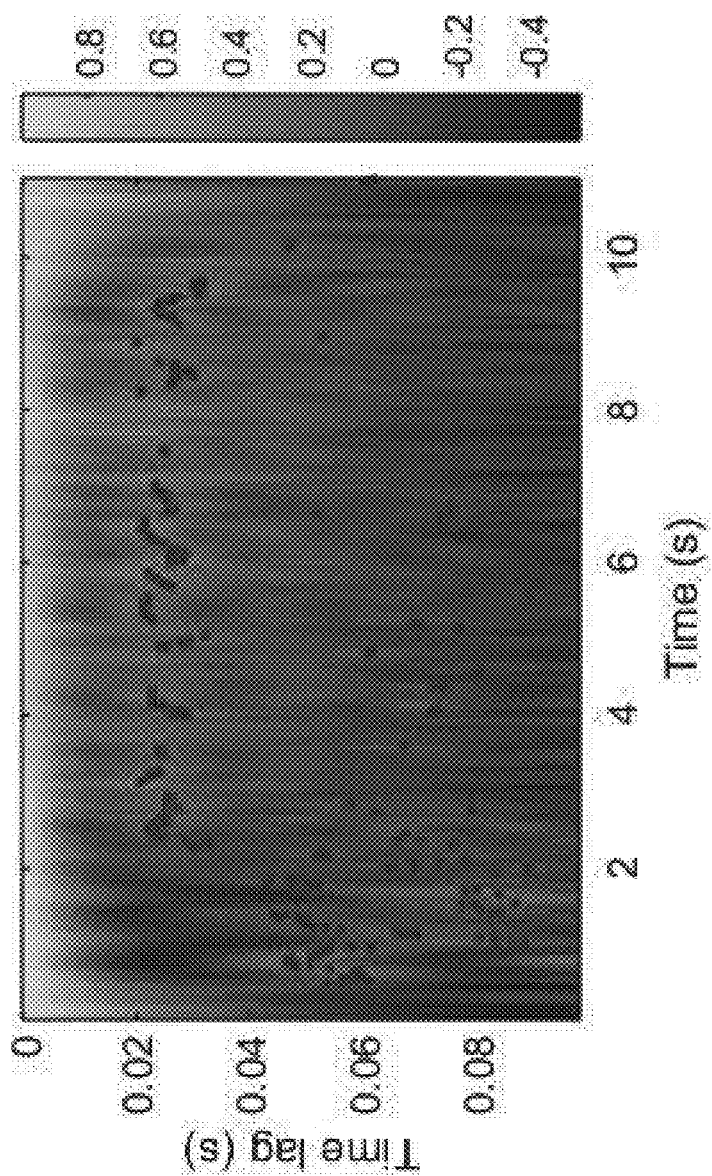
FIG. 2D illustrates an exemplary matrix of differences of combined speed signals, according to some embodiments of the present teaching.
Figure 3:
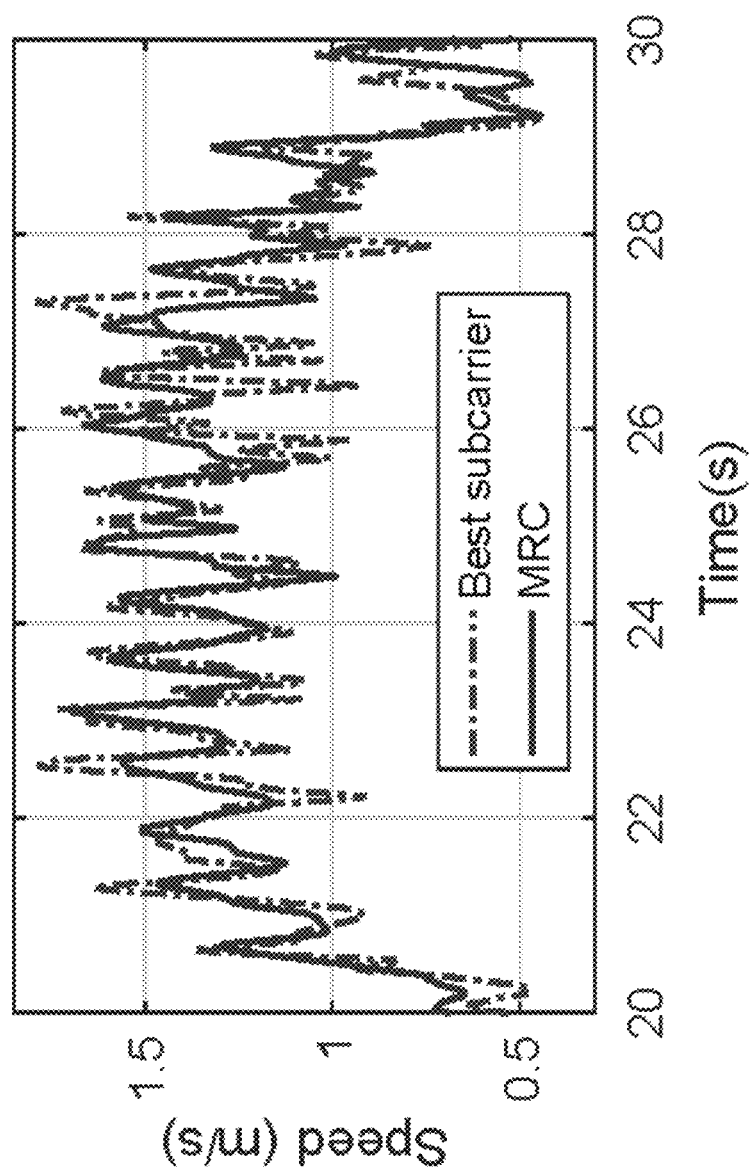
FIG. 3 illustrates an exemplary performance of speed estimation, according to some embodiments of the present teaching.

In one embodiment, two steps are further taken to enhance the speed estimation. First, to facilitate peak finding, the difference of the combined speed signal is used, as shown in FIG. 2B and FIG. 2D. In this case, x0 becomes the location corresponding to the first peak of the derivative of $J_0(x)$. Second, the disclosed system can use the phase difference between two receive antennas to eliminate errors in the raw phase. Thanks to ACF, the disclosed approach is insensitive to the initial phase offsets. FIG. 3 shows the speed estimates of a 10-second period during a user's continuous walking. FIG. 3 also shows that MRC largely enhances the speed estimation.

Figure 4:
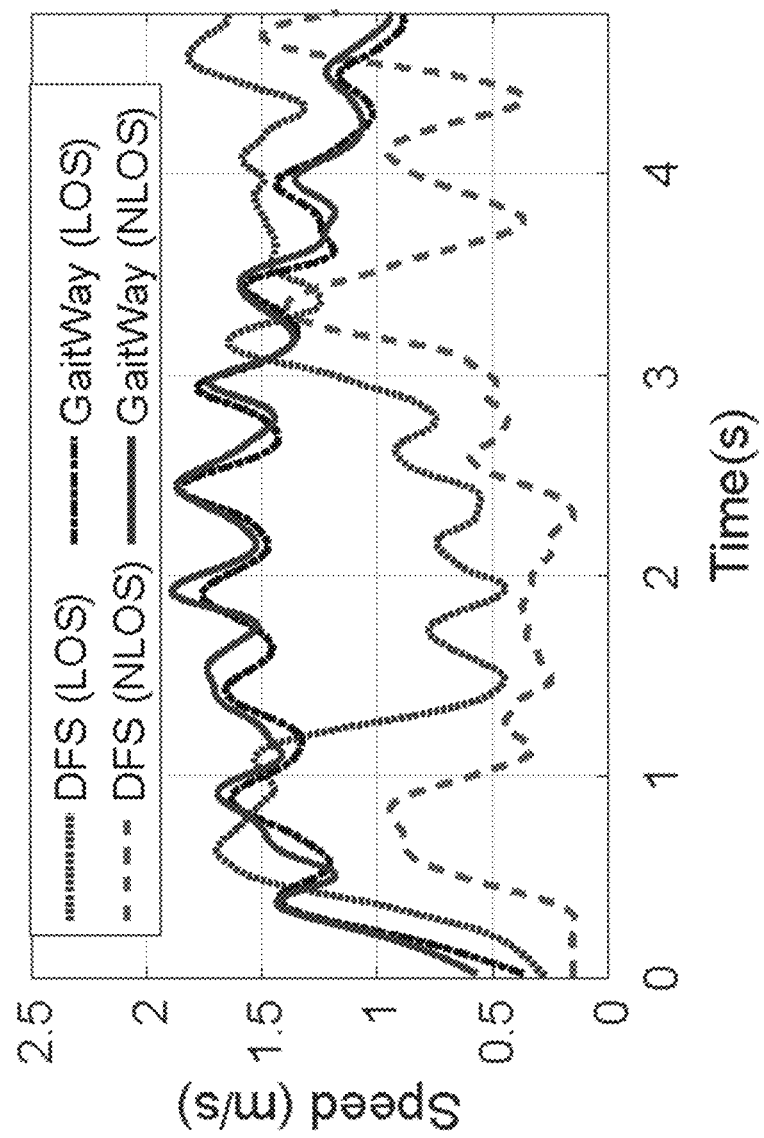
FIG. 4 illustrates a performance comparison of exemplary speed estimation methods, according to some embodiments of the present teaching.

The disclosed system can implement the DFS-based method and compare it with the proposed approach by real measurements. Specifically, the disclosed system can set up two links (one Tx with two Rx in a line), one with LOS and the other with NLOS condition. A user is asked to walk towards the links and the two receivers can measure the CSI simultaneously. FIG. 4 depicts the speed estimated by GaitWay and DFS-based methods, respectively. As seen, GaitWay accurately captures the speed using either the LOS or NLOS link, preserving the precise in-step speed changes. The speed estimates on both links are highly consistent with each other, with only marginal differences in the absolute values. The DFS-based method, however, fails to capture the precise speeds in both LOS and NLOS scenarios.

Rather than only allowing a user to walk along a predefined straight path with an approximately constant speed and assuming all data are collected during stable walking, the disclosed system aims at acquiring gait information for free natural walking. A user may perform various activities, including walking, sitting, standing, and typing, etc A user will also walk with different speeds, especially when one is starting to walk from standing still, making a turn, or about to stop, etc. During these periods, the walking speed does not necessarily reflect the most distinctive and stable gait characteristics. Hence, the first step for gait analysis and recognition is to identify a period of stable walking, during which a subject walks normally with habitual pace.

One can devise an algorithm that automatically detects stable period during a user's normal activities. When a user is walking smoothly, the observed speed will reach to a certain range with repetitive patterns due to the periodic step rhythms.

Figure 5:
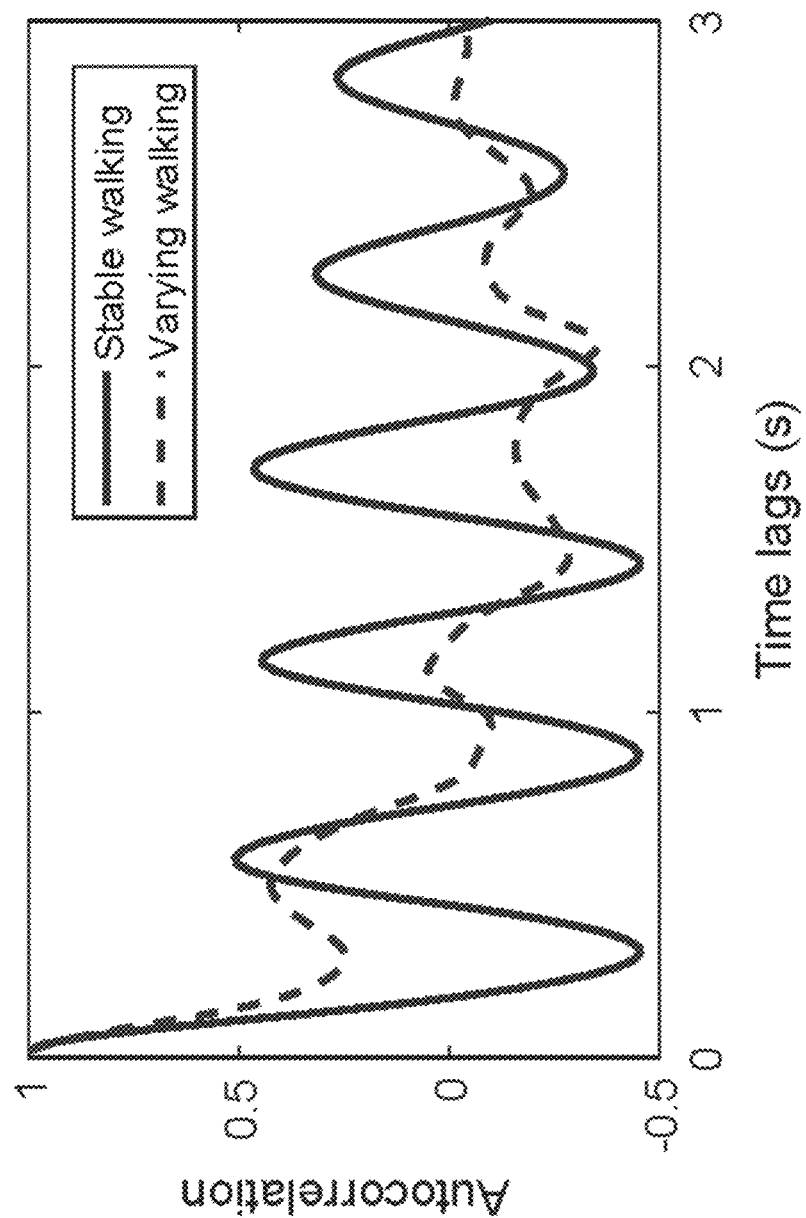
FIG. 5 illustrates an exemplary performance of a periodic autocorrelation function (ACF) of a walking speed, according to some embodiments of the present teaching.

The disclosed system can use the ACF of the speed to measure such walking periodicity. As shown in FIG. 5, when a user is walking stably, evident peaks will be observed from the ACF of the speed. In contrast, the ACF will be more flatted out for varying walking. The disclosed system can apply a sliding window (e.g. 3 seconds) to the speed estimates and calculate the ACF for each window. The disclosed system can then employ peak detection on the ACF of the speed and examine the first peak. A period will be considered as stable walking only if a continuous series of reliable peaks are observed.

Figure 7:
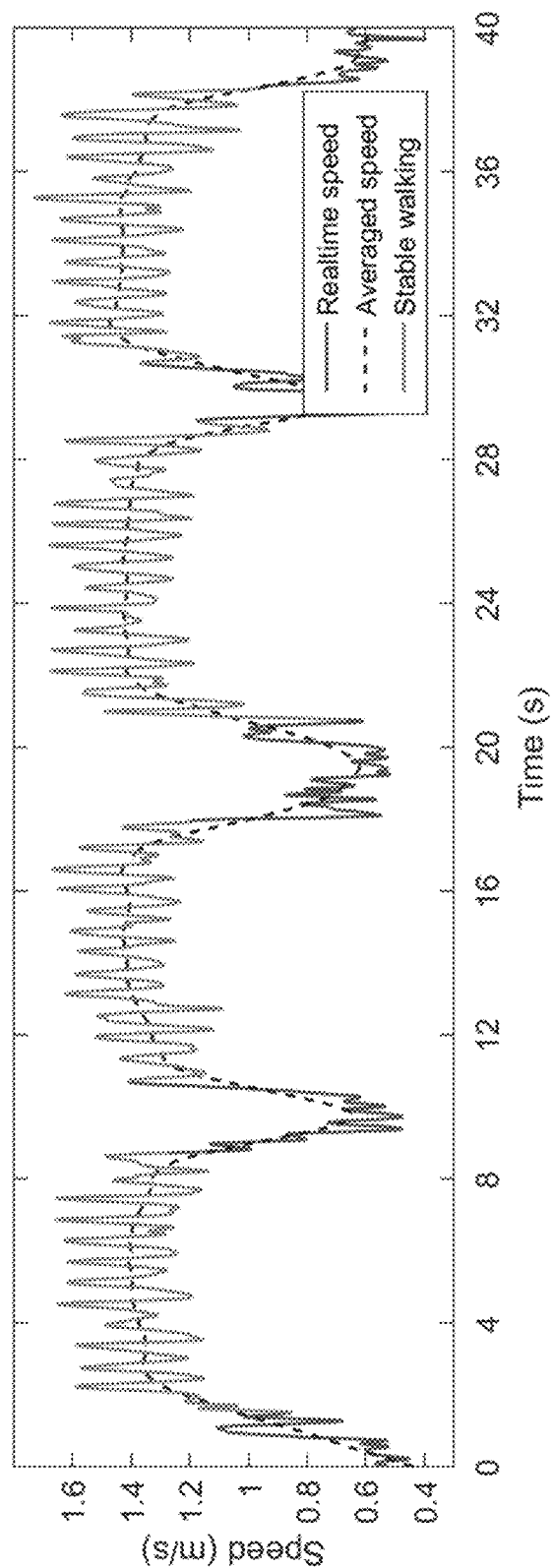
FIG. 7 illustrates an exemplary performance of an extracted stable walking period, according to some embodiments of the present teaching.

To be more robust, the disclosed system can further check the averaged center trend of the walking speed. A walking period will be used for gait analysis only when the average speed is larger than a certain value (e.g., 0.7 m/s, which is smaller than normal human walking speed ranging from 1.0 m/s to 2.0 m/s). FIG. 7 illustrates an example of the identified stable walking periods. The speed is measured when a user is walking back and forth along a 10-meter corridor for 4 times, ach stable period then becomes a gait instance with a speed series $V=[v(t_i), i=1, 2, \ldots, M]$.

Figure 6:
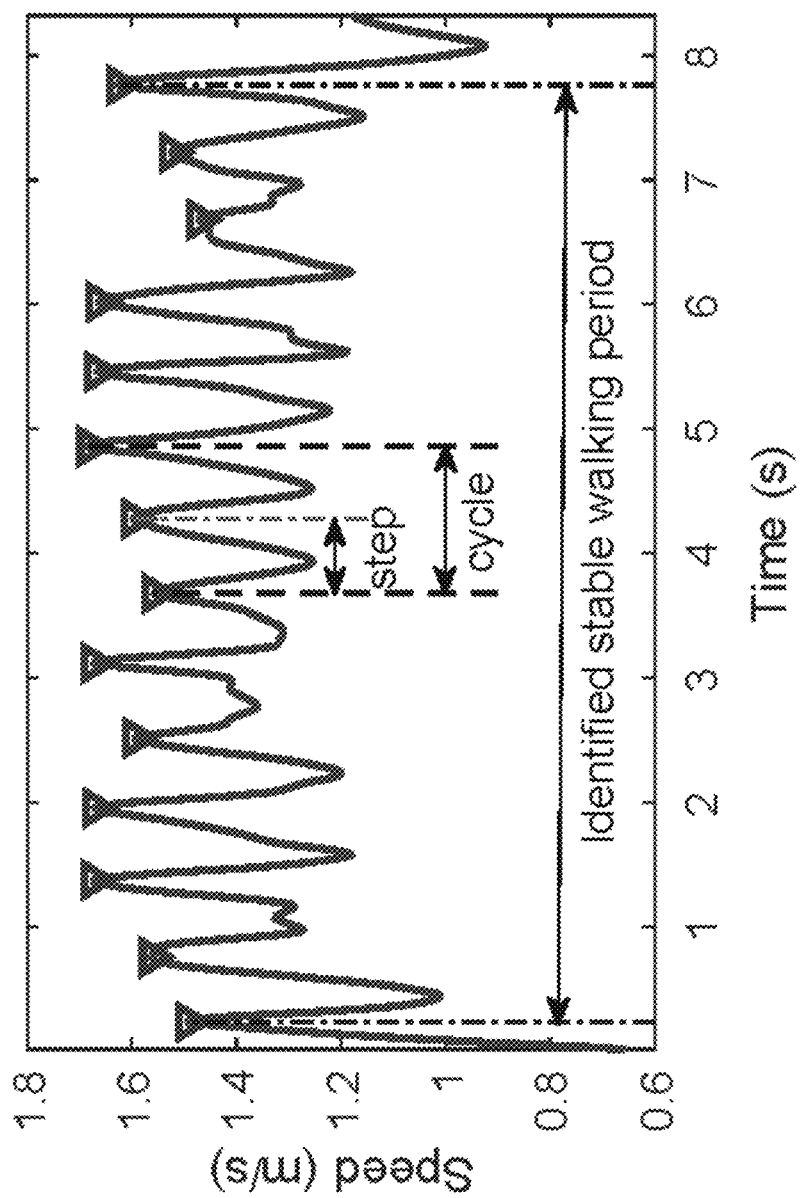
FIG. 6 illustrates an exemplary performance of a gait cycle estimation, according to some embodiments of the present teaching.

The disclosed system can also estimate a gait cycle, which is defined as the duration between two consecutive events that the same heel hits the ground during walking. The disclosed system not only estimates the gait cycle time, but also segments the speed series for every individual step. During normal human walking, a subject's speed will experience an increase followed by a decrease, resulting in a speed peak for each step. Therefore, the disclosed system can perform a simple peak detection on the speed series to identify steps, as shown in FIG. 6. To combat noises and outliers, certain constraints (including peak prominence and height) are applied for peak detection. When all steps are identified, the disclosed system can trim the walking period by removing the duration before the first peak and after the last peak. The remained trace becomes a valid gait instance for further analysis in one embodiment of GaitWay.

The disclosed system can also analyze individual gait. Various gait properties can be analyzed from the walking speed and the identified gait cycles. To monitor and assess a subject's gait, the disclosed system can investigate three properties, i.e., average walking speed, gait cycle time, and stride length. In addition, the disclosed system can also adopt a measure for stability and symmetry, i.e., harmonic ratio, to evaluate gait progression A stride is a complete gait cycle, which includes 2 step segments for a 2-legged animal, 3 step segments for a 3-legged being, and 4 step segments for a 4-legged being.

Figure 8:
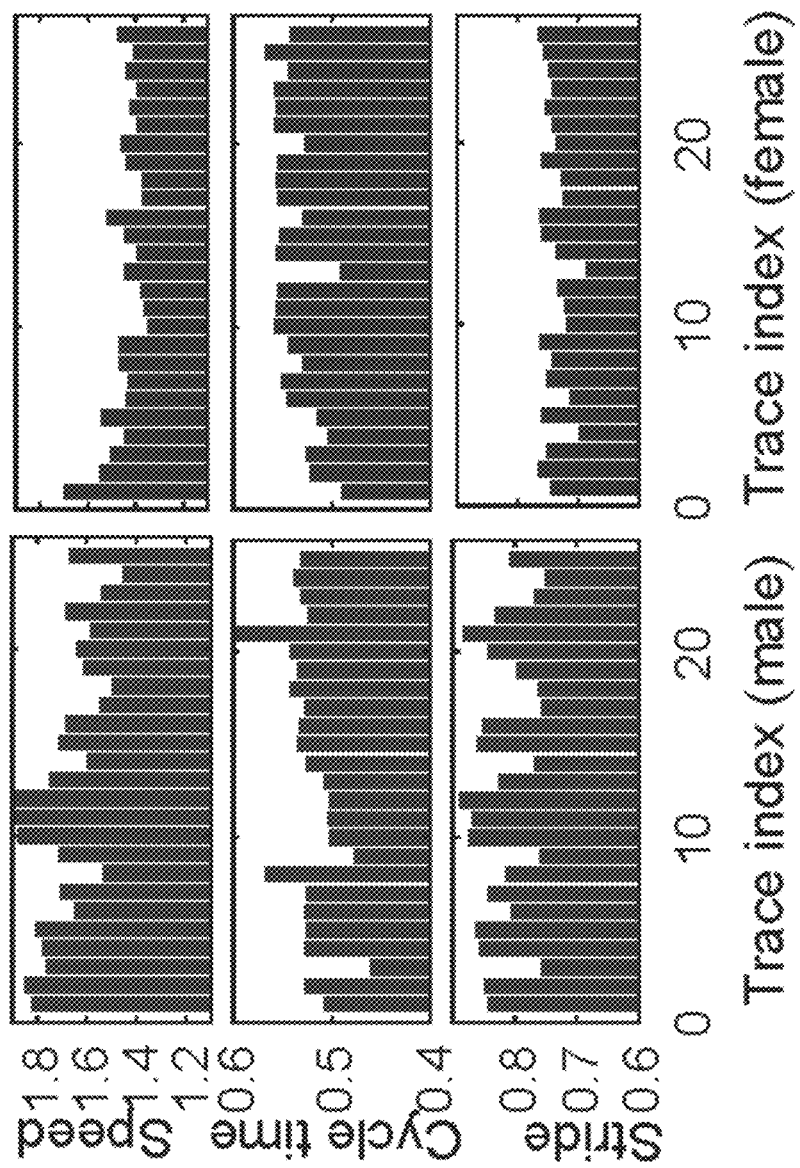
FIG. 8 illustrates an exemplary performance of a continuous monitoring of walking parameters over time, according to some embodiments of the present teaching.

In one embodiment, the average walking speed is simply taken as the mean value of instantaneous estimates of a user's walking speed. As shown in FIG. 8, the disclosed measurements demonstrate that different users have different habitual speeds, and a user's walking speed varies over time.

In one embodiment, the gait cycle time is computed as the mean duration of every two consecutive steps. The middle row of FIG. 8 illustrates the average cycle time of two users' walking instances measured at different locations and time. Over the 20 traces, variances of 0.7 ms and 0.6 ms are observed for the two users, respectively.

In one embodiment, the stride length estimation can be performed by the disclosed system as well Thanks to the accurate speed estimation, one can intuitively derive the stride length by integrating the speed estimates over the time duration of each step. The bottom row of FIG. 8 depicts the estimated stride lengths for two users.

Figure 9:
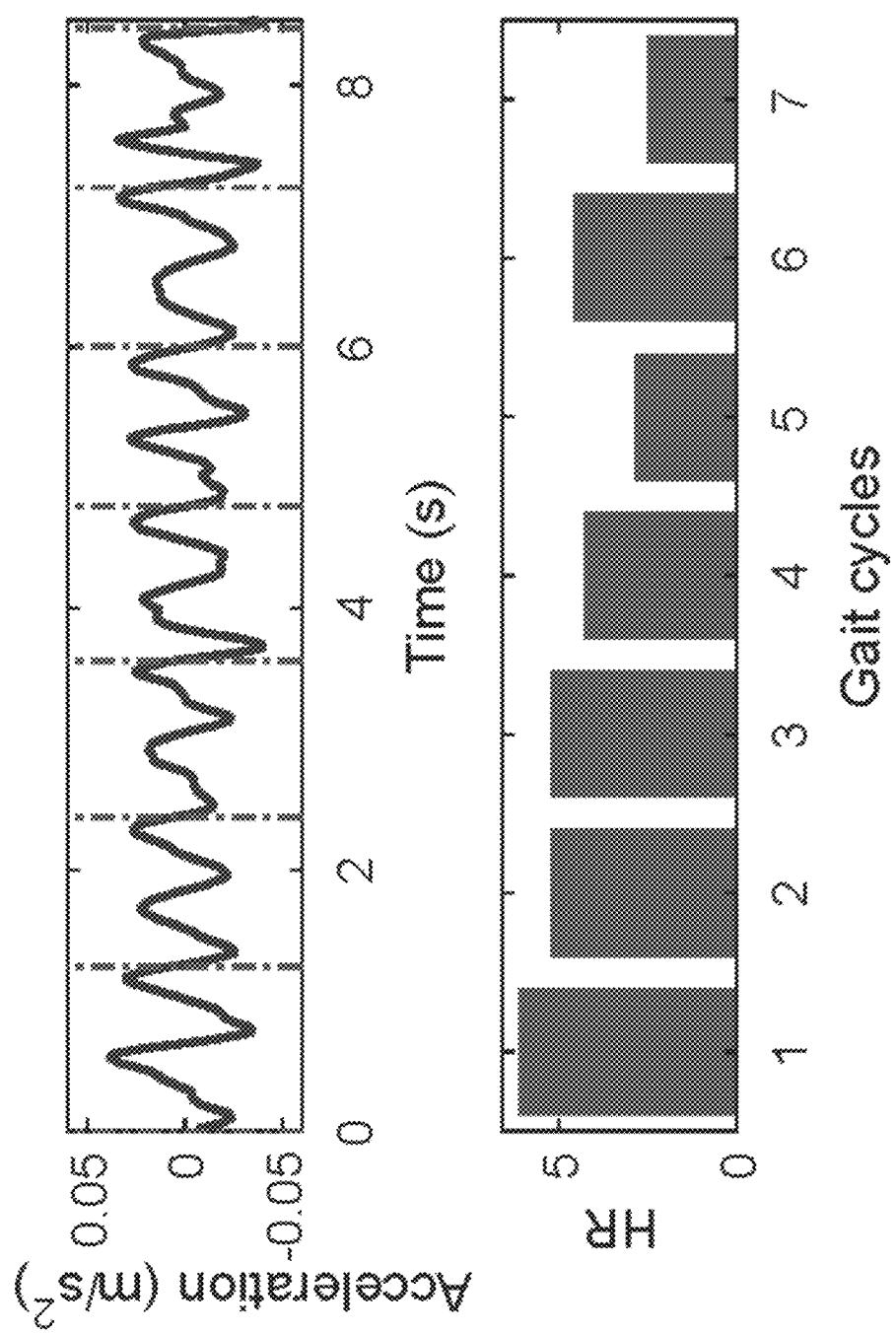
FIG. 9 illustrates an exemplary performance of a progression of harmonic ratios of a short walking trace, according to some embodiments of the present teaching.

The harmonic ratio (HR) may be adopted as a quantitative measure of walking smoothness. There is an increasing interest in using HR technique to study the impacts of various pathologies as well as monitor rehabilitation. HR examines the step-to-step symmetry within a stride by quantifying the harmonic composition of the accelerations for a given stride. It first conducts Discrete Fourier Transform (DFT) on the acceleration within each stride. The HR may be defined as the ratio of the sum of the amplitudes of the even harmonics to the sum of the amplitudes of the odd harmonics. The disclosed system can use the first twenty harmonics to calculate the HRs, as justified for normal cadences for which the majority of the power occurs below 10 Hz. FIG. 9 illustrates the HRs of a walking trace of 7 cycles (14 steps), demonstrating the progression of step-to-step symmetry during the walk.

Figure 10:
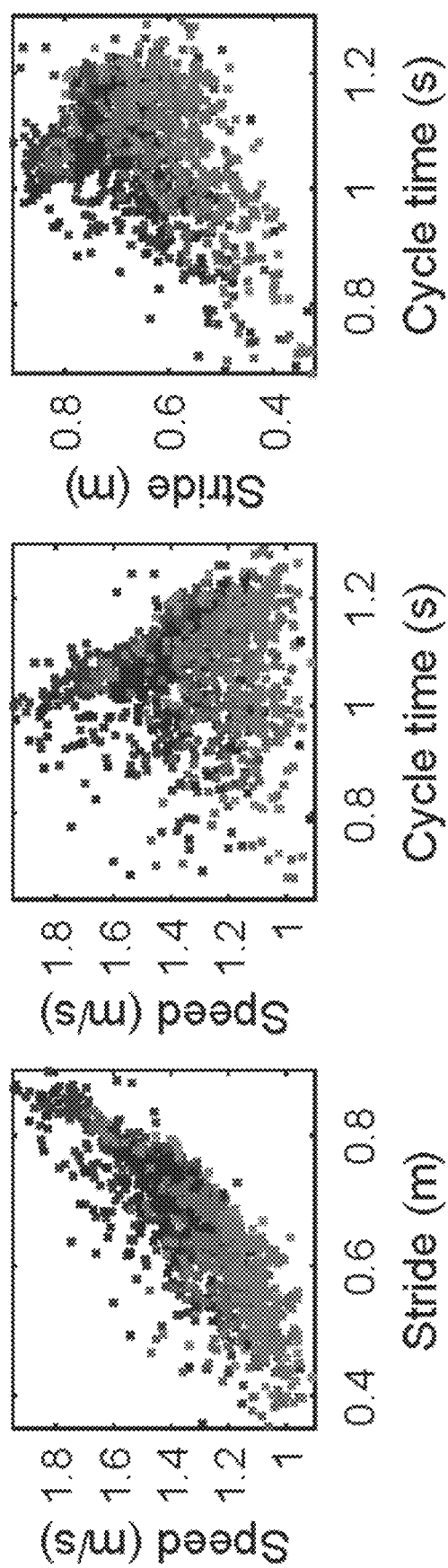
FIG. 10 illustrates exemplary relations among stride, cycle time, and speed, according to some embodiments of the present teaching.

The disclosed system can investigate the pair-wise relationships among stride length, stride time, and walking speed and make a remark for research related to pedestrian dead-reckoning. To this end, the disclosed system can integrate the measurements of 6 users collected under different scenarios and visualize the relationships in FIG. 10. As shown, stride length evidently changes with respect to walking speed for different users, indicated by different gray scales. Therefore, it introduces significant errors to assume a fixed stride length, and accordingly derives walking distance by multiplying it with step count, as done by many previous works on pedestrian dead-reckoning.

In addition, in the disclosed measurements, the data are collected and extracted automatically when the subject is walking around freely, without being asked to walk along a predefined path or a predefined direction, nor to walk with an intentional speed. In practice, the involved subject does not even need to be aware of the data collection. This is a critical property that underpins a continuous gait monitoring and recognition system. It significantly differs from previous works that exert parts or all of these constraints to testers in order to obtain environmentally repeatable features for human recognition, or to derive DFS.

Instead of extracting data-driven features directly from CSI measurements, which are implausible and contain environment-dependent features, the disclosed system performs human identification by extracting true gait features, which are physically plausible and environmentally irrelevant, from the speed estimates. In addition to the above-discussed parameters for gait monitoring, the disclosed system can devise a number of features to characterize various aspects of one's gait pattern.

Figure 11A:
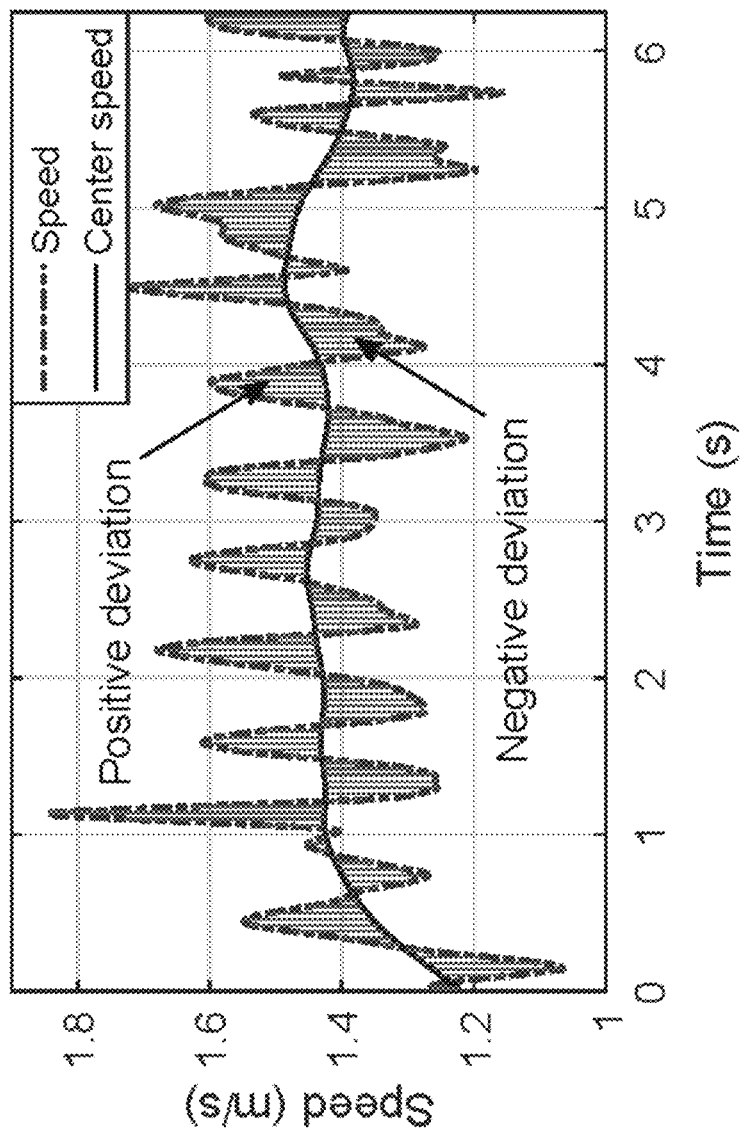
FIG. 11A illustrates exemplary features of speed deviation, according to some embodiments of the present teaching.
Figure 11B:
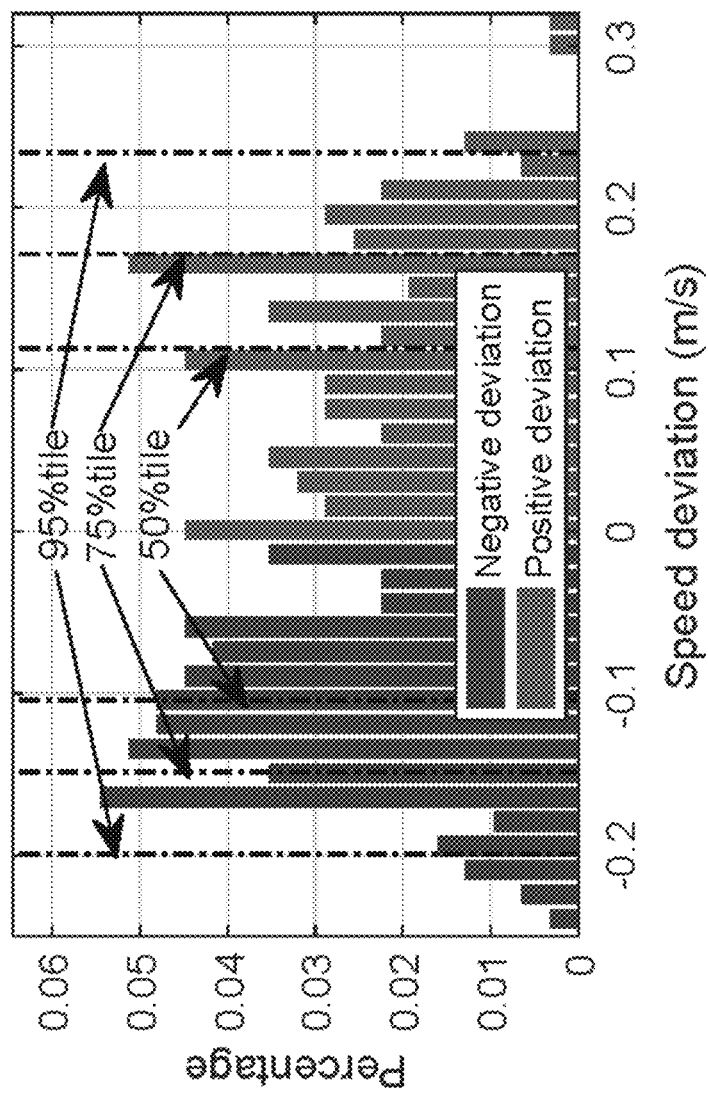
FIG. 11B illustrates exemplary histograms of speed deviation, according to some embodiments of the present teaching.

For gait speed, the disclosed system does not directly use the average walking speed as a feature since a subject's speed varies considerably over time. The disclosed system can exploit features that are independent from the mean walking speed. As shown in FIG. 11A, the disclosed system can first detrend the absolute speed by subtracting the average center speed. Then the disclosed system can calculate the different percentile values (e.g. taking 95% tile, 75% tile, and 50% tile in one embodiment of GaitWay as shown in FIG. 11B) of the speed deviations. Specifically, the disclosed system can take these percentile values of the positive deviations, negative deviations, and the absolutes of all deviations, respectively.

An acceleration may be computed as the derivatives of speed. The disclosed system can take the maximum, minimum, and variance of the acceleration Since the walking acceleration also exhibits sinusoid-like patterns, the disclosed system can also identify the peaks and valleys of the acceleration sequence and compute the respective variances.

A level of symmetry is also a feature of a gait. The disclosed system can calculate the step time and stride lengths of left and right foot respectively and take their means and standard deviations as features. The difference of each feature between two feet is derived as a measure of gait symmetry.

Rhythmicity and cadence can be measured based on a gait Referring back to FIG. 5, the disclosed system can calculate the ACF of the walking speed. If a user walks in a regularly rhythmic manner, the speed ACF will exhibit multiple prominent peaks and will decay slowly. Hence the ACF embodies the walking rhythmicity, or dynamic stability. The disclosed system can thus develop several features based on the ACF of the speed. In one embodiment, the disclosed system GaitWay can apply a sliding window to calculate a series of ACF for each walking instance, resulting in a speed ACF matrix. From there, the disclosed system can first identify the prominent peaks and the corresponding delays of each ACF and then extract the following single-valued features: the mean and variance of the values of the first peaks of the ACFs and the number of identified prominent peaks, the variance of peak cycles (i.e., differences of peak delays for each ACF, corresponding to the differences in consecutive step cycle time), and the ratio of ACFs in the matrix that do not observe a prominent first peak.

In one embodiment, harmonic ratio (HR) is used as a measure of gait smoothness. For every gait cycle during walking, the disclosed system can obtain one HR value. To obtain a single value feature for a walking trace, the disclosed system can take the median and variance of the HR values.

Figure 12:
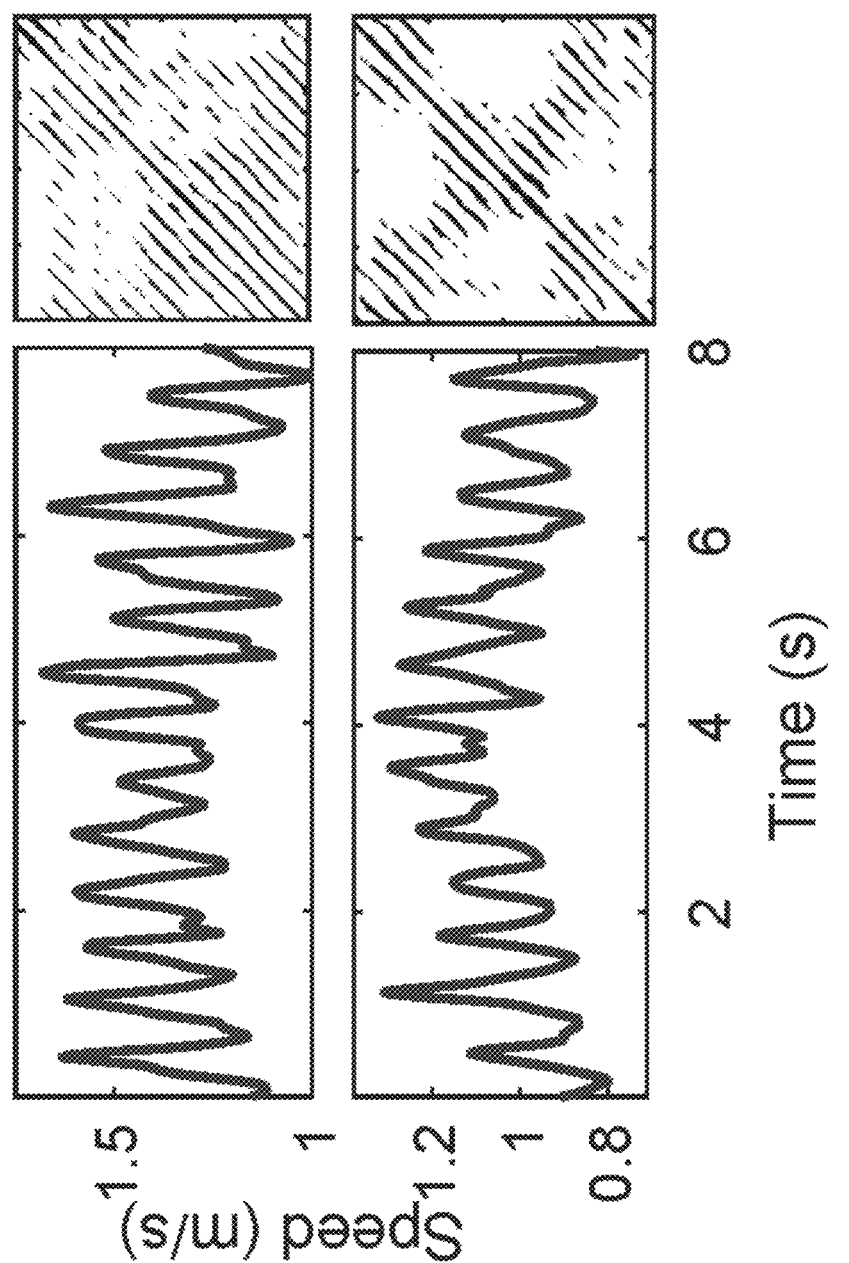
FIG. 12 illustrates exemplary recurrent plots for different users, according to some embodiments of the present teaching.

To quantify the gait variability, the disclosed system can adopt Recurrence Quantification Analysis (RQA), a method of nonlinear data analysis which quantifies the number and duration of recurrences of a dynamical system presented by its phase space trajectory. It describes the recurrence property by analyzing the recurrent plot (RP) that visualizes and reveals all the times when the phase space trajectory of the dynamical system visits roughly the same area in the phase space. Such an RP is mathematically expressed as an N*N matrix R: $R_{ij}=\Theta(\epsilon-\|\vec{x}_i-\vec{x}_j\|)$, $\vec{x}_i \in \mathbb{R}^m$, i, j=1, 2, . . . , N, where N is the number of states, $\epsilon$ is a predefined cutoff distance, $\|\cdot\|$ is a norm and $\Theta(\cdot)$ the Heaviside function. In one embodiment of GaitWay, the state space trajectory X is constructed from the speed series $\{v_i, i=1, 2, \ldots, L\}$ with an embedding dimension of 5 and a delay of 10 samples. FIG. 12 depicts two illustrative RPs for two different users, where the upper RP presents more diagonal lines, indicating more stable and periodic gait. A number of measures can be derived by RQA based on the RP. In one embodiment of GaitWay, one can exploit the below four measures to reflect different properties of RP: (1) a recurrence rate which is the percentage of recurrence points in an RP; (2) a determinism which is the percentage of recurrence points that form diagonal lines; (3) the Shannon entropy of the probability distribution of the diagonal line lengths; and (4) the average diagonal line length. The measurements show that RQA reaches a stable value when calculated over 4 gait cycles, suggesting a shortest length for stable walking period detection. In practice, the disclosed system can relax the minimum to 3 cycles (i.e., 6 steps) to gather more available data. Walking period with less than 3 cycles may not be considered for gait recognition.

Figure 13:
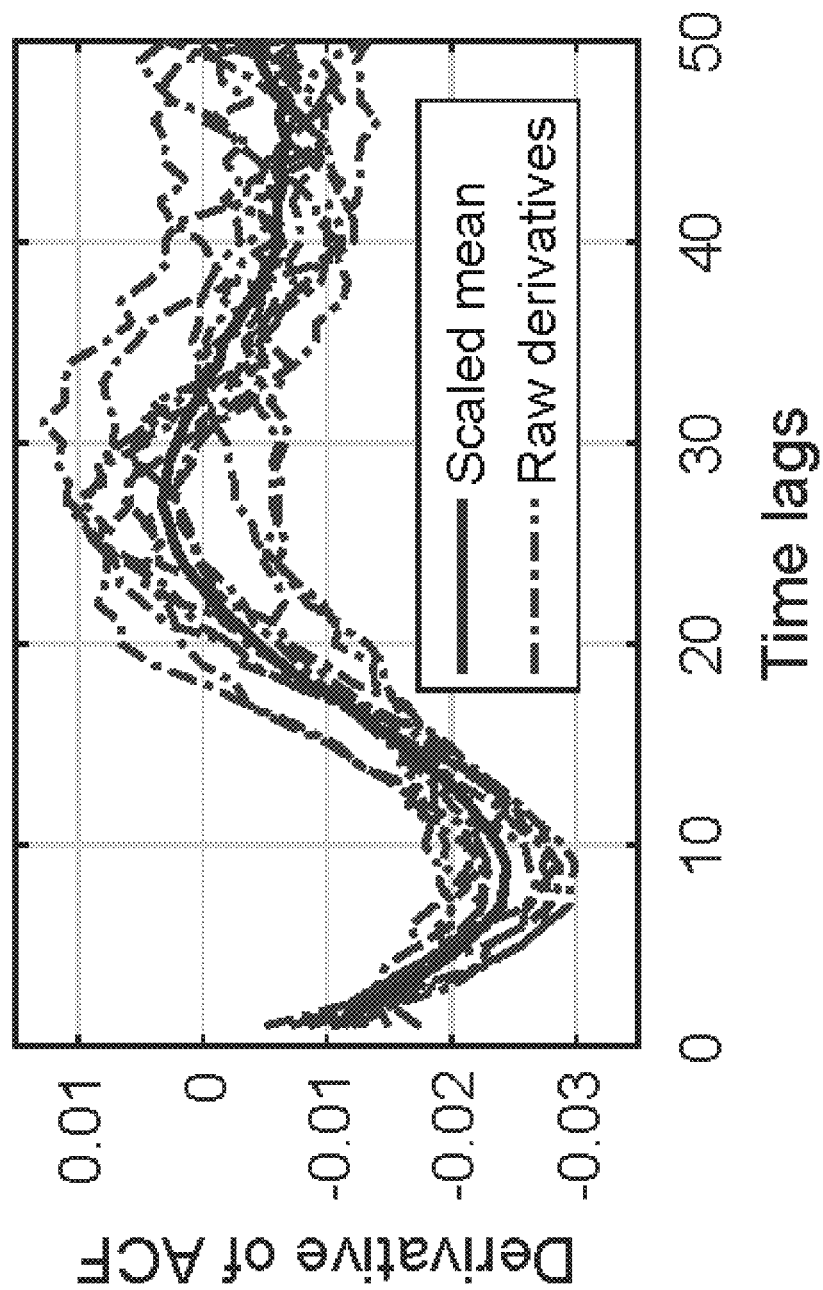
FIG. 13 illustrates exemplary scaled ACF features, according to some embodiments of the present teaching.

The disclosed system can also investigate the ACF of CSI (as shown in FIGS. 2A-2D) for feature extraction. Since the ACF is entwined with walking speed yet is independent of location and environment, it can serve as a signature for gait classification. Specifically, rather than using all ACFs within a walking period, one can consider the ACF corresponding to the speed peaks, as identified in FIG. 6. Note that the peak speeds could be different within a walking trace, i.e., the locations of the first peak of the ACF vary over time. Hence the disclosed system can align all the ACFs to a scale corresponding to the mean peak speed. To make it more apparent, the disclosed system can take the difference of each ACF and then average the aligned ACF differences. FIG. 13 illustrates an example of the scaled ACF differences. The disclosed system can use the first 50 taps as a feature vector in the disclosed system.

Figure 14:
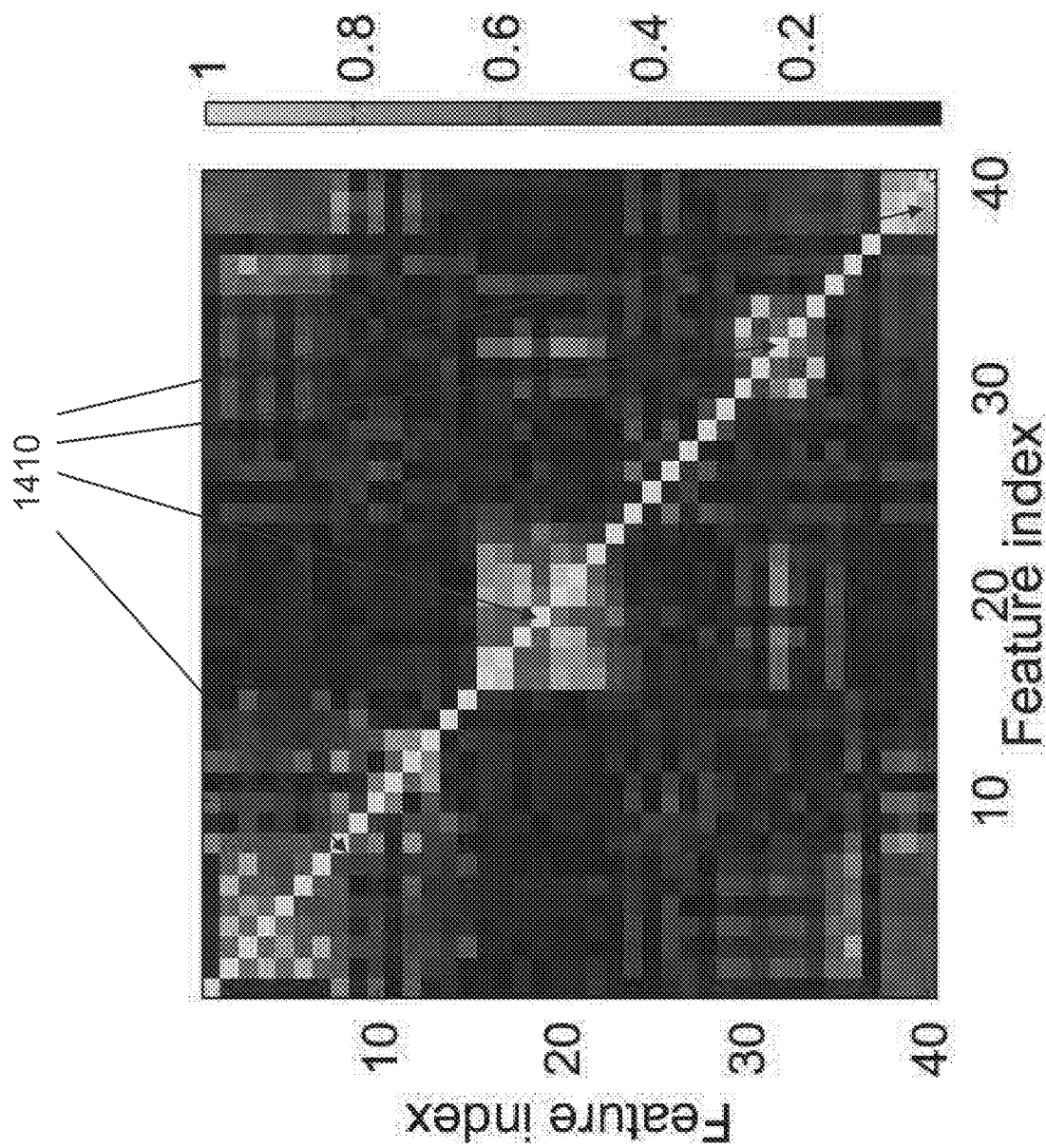
FIG. 14 illustrates an exemplary feature correlation matrix, according to some embodiments of the present teaching.

The disclosed system can fuse all the above features together, resulting in a 90-dimensional feature vector for each gait instance. The disclosed system can conduct the following two steps for potential dimension deduction. First, the disclosed system can investigate whether these features are correlated with each other or not. The disclosed system can calculate the pair-wise correlations of all the features (except for the 50-dimensional ACF features that are taken as a whole) and depict the correlation matrix as in FIG. 14. Most of the extracted features are independent from each other. Some features are more correlated than others, as indicated by four more clustered areas 1410 along the diagonal line in the correlation matrix. For example, features #2 to #8 are all related to cycle time and thus more correlated. Similarly, features #16 to #23 are different measures of the speed deviation. Features #30 to #34 are acceleration-related while features #38 to #40 are all extracted by RQA. The disclosed system can eliminate one of each pair of highly correlated features for classification. Second, the disclosed system can employ an outcome-based approach for feature selection. Specifically, the disclosed system can perform 10-fold cross validation with and without a specific feature, and keep that feature only if it improves the output classification accuracy.

Given the features extracted, the disclosed system can identify a user (from others) by the gait patterns. Following the gait recognition, one can consider two identification scenarios: single user verification that validates whether a user is the target subject or an unknown stranger, and multiple user recognition that identifies which target subject the user is among a set of candidates. The disclosed system can leverage Support Vector Machine (SVM), a classification technique, for this purpose. The disclosed system can use SVM instead of the popular deep learning techniques mainly because the primary goal here is to demonstrate the effectiveness of the speed estimates and the physical plausible features for gait recognition. In one embodiment, one can keep applying deep learning in the disclosed system.

For single user verification, the disclosed system can train a gait model for the subject by building a binary classifier, which sees the subject's gait instances as positive class and several benchmark users' as negative class. The benchmark data could be obtained from available standard public database. In one embodiment of GaitWay, they are randomly selected from the experiment participants. To authenticate the target person, the disclosed system can calculate the probability that an instance fits the target class. A testing gait instance is considered belonging to the target subject when the probability is higher than a threshold, and is otherwise rejected. In practice, the threshold can be defined as different sensitive level by the users to adapt to different authentication applications.

To recognize multiple users, the disclosed system can train a one-vs-all binary classifier for each user, with the gait instances from this user as the positive class and the instances from all other candidates as the negative class. Then given a gait instance for testing, the disclosed system can feed it into every classifier and obtain the fitness probability that the instance belongs to each class. The gait instance may be assigned to the user from whose classifier the highest fitness probability is observed. In one embodiment, the disclosed system can use a SVM tool with the Radial Basis Function (RBF) kernel. The optimal values for parameters γ and c are selected by grid search with 10-fold cross validation Features may be scaled to [0,1] for classification.

In one embodiment, a rhythmic motion of the object, e.g. a gait of a person, can be monitored based on a time series of intermediate quantity (IQ), which is computed by the disclosed system based on channel information of a wireless multipath channel, where the wireless multipath channel is impacted by the rhythmic motion of the object. In one embodiment, after the time series of speed (IQ) is obtained, a time series of speed is analyzed in search of a time window of stable gait motion (e.g. a rhythmic motion). When there is a stable gait, the mean (average) speed should not be too small, and there should be a strong local maximum in the autocorrelation function of the IQ. In another embodiment, a peak detection is performed to compute local maximum of speed in the time window of stable rhythmic motion of the object.

In one embodiment, a "step" segment of time window is defined as the time from a local maximum to the next local maximum A step segment may correspond approximately to the left foot touching the ground, and the next step segment may then correspond approximately to the right foot touching the ground. It is "approximate" because the heel does not necessarily start to touch the ground or leave the ground at the time of maximum speed (IQ). Two consecutive step segments, together, can define a gait cycle or motion cycle. In another embodiment, the local maximum can be replaced by local minimum in this claim. In another embodiment, the time window of stable rhythmic motion may be adjusted e.g. by pruning/removing some IQ from both ends of the time window as the rhythmic motion at both ends may not be fully stable or in steady state. If a person starts from motionless to walk, some initial moments in the time window may have the person still in the "acceleration" mode, and some of the last moments in the time window may have the person already in "deceleration" mode. One way to identify these non-steady-state IQ is that the time difference between adjacent local maxima may be increasing, or decreasing. In steady state, the time difference should be somehow stable.

There are some gait-speed related features Gait speed (e.g. walking speed) itself is important for health-related monitoring. But gait speed may be less useful for gait recognition (i.e. recognizing a person based on his/her gait). Instead, analytics derived from gait speed such as speed deviation, peak variance, valley variance, harmonic ratio may be more important Gait features or motion features may be related to a step segment (e.g. half of a motion cycle for a 2-legged animal, a quarter of a motion cycle for a 4-legged animal, or 1/N of a motion cycle for a N-legged animal). When a N-legged animal moves forward, each of the N legs takes turns to have maximum forward (or positive) speed. The IQ (speed) may have N local maximum in a motion cycle of the N-legged animal. A step segment may comprise a time period from a local maximum to the next local maximum, or a phase-shifted version of the time period.

For a 2-legged person, a motion cycle has two step segments. Odd step segments may correspond to left foot movement (or left step in a motion cycle) while even step segments may correspond to right foot movement (or right step in a motion cycle). As an example, each left step may correspond to the period from left foot touching the ground to right foot touching the ground. Each right step may correspond to the period from right foot touching the ground to left foot touching the ground. Alternatively, each left step may correspond to the period from left foot leaving the ground to right foot leaving the ground. Each right step may correspond to the period from right foot leaving the ground to left foot leaving the ground.

Some motion features are related to a stride or a motion cycle. For 4-legged animals, odd motion cycles may correspond to two legs and the even cycles may correspond to the other two legs. In galloping, for example, the odd cycles may correspond to the front two legs, and the even cycles may correspond to the rear two legs. In trotting, the odd cycles may correspond to front left leg and rear right leg and the even cycles may correspond to rear left leg and front right leg. Some motion features are related to N-step segments (e.g. a 3-legged device may have 3 step segments). The motion cycles may form a wavefront, with 3 phases. Phase 1 (cycles 1, 4, 7, ... ) may correspond to leg 1 (or legs 2 & 3) Phase 2 (cycles 2, 5, 8, ... ) may correspond to leg 2 (or legs 1 and 3). Phase 3 (cycles 3, 6, 9, ... ) may correspond to leg 3 (or legs 1 and 2).

Figure 15:
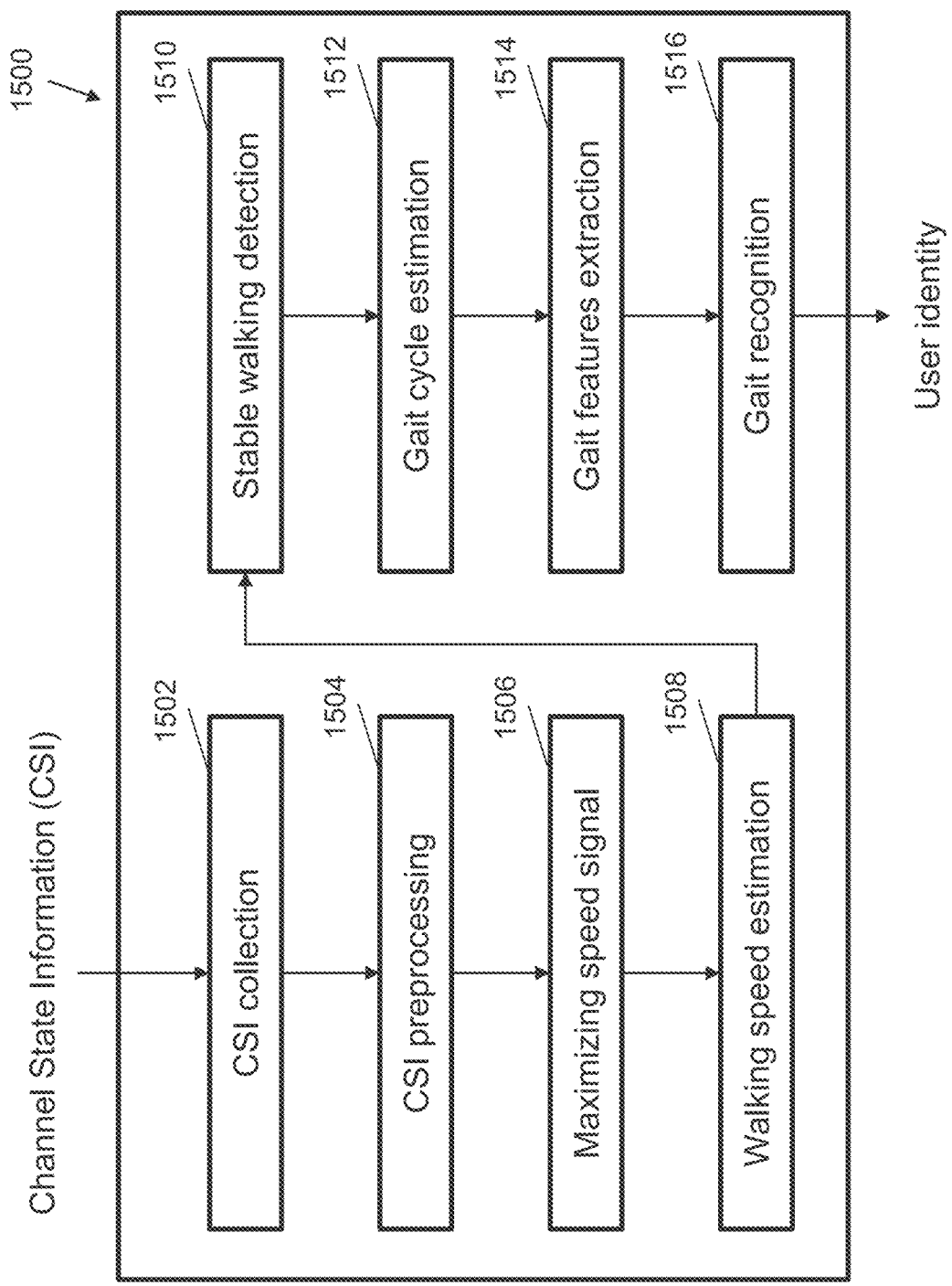
FIG. 15 illustrates an exemplary method for gait recognition, according to some embodiments of the present teaching.

FIG. 15 illustrates an exemplary method 1500 for gait recognition, according to some embodiments of the present teaching. As shown in FIG. 15, a channel state information (CSI) of a wireless multipath channel is first collected at operation 1502. The wireless multipath channel is impacted by a gait of a moving person or animal. At operation 1504, the CSI is preprocessed. Based on the preprocessing, a speed signal is maximized, e.g. based on MRC, at operation 1506 to achieve a maximum SNR. At operation 1508, the walking speed is estimated based on the maximum SNR.

At operation 1510, a stable walking period is detected. Based on the stable walking period, a gait cycle is estimated at operation 1512. Then gait related features are extracted at operation 1514 from the gait cycle. At operation 1516, the gait is recognized based on the extracted gait features. For example, by comparing the gait features with features stored in a database, a user identity is determined for the user moving with the gait.

The disclosed system GaitWay can be implemented on commodity WiFi devices and conduct experiments in a typical building with an area of about 5,000 ft$^2$. In one embodiment, one can consider different settings by placing the WiFi Tx and Rx at different locations during multiple sessions of data collection. In one embodiment, the disclosed system can have 6 different settings, where the Tx and Rx are put on a stand with a height of about 1 m. The Tx and Rx are separated by 8 to 11 meters for all settings, blocked by one or multiple walls. The Tx and Rx are both commercial laptops equipped with off-the-shelf WiFi network interface card and unmodified omnidirectional chip antennas. The disclosed system can use 5.8 GHz channels (by default channel 161) with a bandwidth of 40 MHz. There are a number of WiFi devices co-existing on the same channel.

In one embodiment, the disclosed system can collected gait instances from 11 human subjects, of which 5 are female and 6 are male. During data collection, the users were walking around continuously and freely in their natural way. The user was free to walk through any area as will. Some of them read news, play mobile games, or talk on the phone while walking. The experiments were conducted on 4 different days over a six-month period. For each day, the disclosed system collected data for two sessions at different time. The disclosed system obtained 8 sessions of data in total, each under a different setting. Users wore different clothes (from summer to autumn) during different sessions of data collection. For each session, the disclosed system measured for about 10~20 minutes of walking for each subject. All human subjects involved in the data collection were approved by IRB. The data were anonymized for privacy concern. In total, the disclosed system can collect about 1030 minutes of walking data from the 11 participants, from which the disclosed system can extract around 970 minutes of walking (i.e., there are about 60 minutes during which a subject is out of effective coverage of the link and the speed is not captured). From these data, the disclosed system can extract 5,283 gait instances of effective stable walking, which occupies about 680 minutes, approximately 67% of the total walking duration. The effective percentage is limited in the data collection because users are walking freely as will with frequently stop-and-go and turning behaviors that could not serve as reliable gait measurements. In practice, the training data collection would be more efficient if the users are cooperative in gait measurements. Comparing with many previous works that require the users to repeatedly walk on a fixed pathway, the disclosed system GaitWay largely eases the task and boosts gait collection to a large scale.

One can separately study the performance of three cases: single user verification, dual user distinction, a special case of multiple user recognition, and general multiple user recognition. Following the gait recognition described above, the disclosed system can use the Receiver's Operating Curve (ROC) for the False Acceptance Rate (FAR) and False Rejection Rate (FRR), and the Equal Error Rate (EER), the point on the ROC where the FAR equals the FRR, to evaluate verification, and Recognition Rate (RR) for recognition evaluation. All the below results of the disclosed system GaitWay are obtained on a 10-fold validation basis.

To evaluate the performance of GaitWay for single user verification, the disclosed system can test each subject in the dataset by using the gait instances of all other users as negative class. The disclosed system can shuffle the training and testing data for 10 folds and depict the integrated results. In one embodiment, GaitWay achieves an EER of 12.58% when using 70% of gait instances for training. In one embodiment, the performance slightly degrades when more sessions over time are involved.

Before evaluating multiple user recognition, it is interesting to study a special scenario of two users since it is very common in practice that two persons share an office room or two residents live in one apartment. It would be particularly useful if the disclosed system can distinguish one from another. The disclosed system can conduct binary classification for every pair of subjects in the dataset. One can consider precision and recall by treating one user as the positive class and the other as the negative class for each group. In one embodiment, GaitWay yields remarkable performance, with an average precision and recall of 94.84% and 95.21% respectively for 55 pairs of users when using 70° %, of data for training. An accuracy of >900/0 can be achieved with only 20% of data for training With the automatic data collection and gait extraction, such an amount of data can be easily gathered by a walk of about 20 minutes, making GaitWay friendly for user enrollment.

The recognition for multiple users is more difficult than verification or pair distinction. In one embodiment, the RR changes with gait variations when involving different sessions, and the performance degrades as the number of sessions increases. This is because a user's gait speed may vary considerably over time. For example, one user in the experiments had a walking speed of about 0.8 m/s in one session while about 1.4 m/s in another session. Although GaitWay circumvents the use of absolute speed, the performance may still be influenced by dramatic changes in walking speed since the disclosed system is built upon walking speed alone. Unless otherwise specified, the disclosed system GaitWay can use all 8 sessions of data in the following evaluation.

As the data are collected and extracted automatically, the duration and step amounts of each gait instance would be different. The disclosed system can thus analyze whether the lengths of walking samples will affect the recognition accuracy. The disclosed system can analyze the length distribution of all testing gait instances. A subject's gait may vary for a very long walking, while too short instances do not comprehensively embody one's gait features.

The disclosed system can analyze the impact of different sessions by examining the error source distribution over data from different sessions. In one embodiment, while most of the data sessions produce similar performance, session #3 sees the worst performance of only 42.19%. This is because the Tx-Rx link is heavily blocked by a reinforced concrete main pillar of about 1 m×1 m, in addition to two walls, and thus the scattering signals can be hardly captured by the Rx. One can inspect the speed estimates from session #3, which affirm to be more noisy than other sessions.

Figure 16:
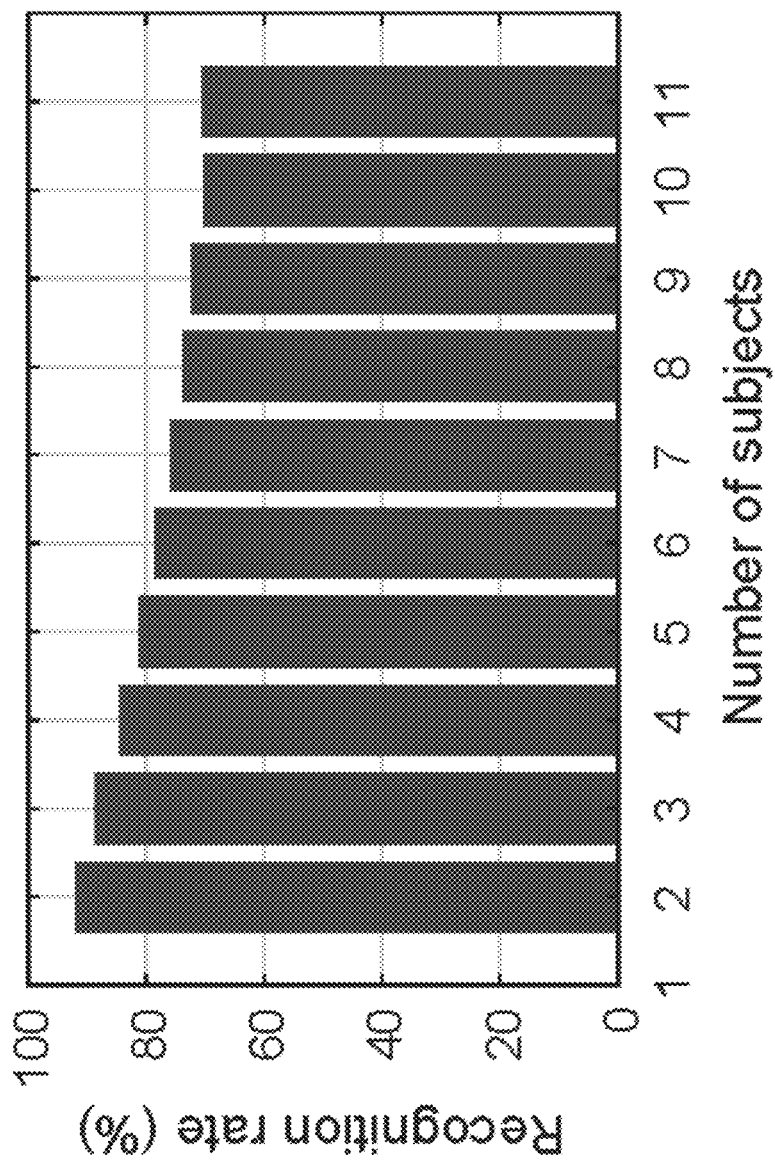
FIG. 16 illustrates an exemplary performance of RR vs number of users, according to some embodiments of the present teaching.

To study the impacts of subject number, one can traverse all 2036 possible combinations of the 11 subjects and integrate the results in FIG. 16. In general, the RR gradually decreases with more users being involved. The disclosed system GaitWay retains a remarkable RR of over 80% when there are 5 subjects, demonstrating promising potential for smart home where there are usually a few residents in a house. In one embodiment, subjects with lower RRs also suffer from relatively larger FAR and FRR among others, indicating that their gait patterns are less distinctive.

The disclosed system GaitWay can run in real time on personal computers. For 1 minute of data, it takes about 27 seconds (20 s for speed estimation, 6 s for stable period identification, and <: Is for feature extraction) in total to process. SVM costs 164 s and 2 s for training and testing with 1,000 instances, respectively. As training can be done offline, this cost is negligible.

Gait and rhythmic motion recognition based on the disclosed systems and methods is particularly appealing for a range of ubiquitous applications that need human identification since it can be achieved at a distance without any active user cooperation. For example, a smart building would automatically open the door for an authorized user when she walks in. A smart home would personalize the temperature and ambient light for a recognized user. A smart TV therein would react with her favorite programs. Smart home devices like Google Home and Amazon Alexa could directly interact with her in a more friendly way. For all of these to function, the user needs to do nothing but walk habitually inside the space, according to various embodiments of the present teaching.

In one embodiment, the disclosed system can monitor a rhythmic motion of an object based on channel information of a wireless multipath channel, and trigger a response action based on a result of the monitoring According to various embodiments, the object may be a person, and the rhythmic motion being monitored may be his walking gait or hand motion or breathing. The monitoring may include an identification of the object. Upon identifying the person, the disclosed system may trigger a response action like: generating a personalized action for the person; and/or controlling a device based on a setting associated with the person. The setting may be based on the time/date of a day and month/season of the year, or a daily/weekly/monthly/yearly routine. For example, the disclosed system may send a signal to: turn on/off or adjust setting of a lamp/lighting/window/window blind/fan/TV/audio/cleaning machine, generate a greeting dialog/recommendation/suggestion/report/briefing/calendar briefing or play music/radio on a smart speaker or user interface, tune radio/TV/streaming device/media player to a channel/source, pre-heat/start a coffee machine/oven/cooking device/car, prepare car/vehicle/garage, unlock door, turn on/off alarm, start/stop some system, set air conditioner/heat to a certain temperature, turn on a computer, warm/cook some food, etc., based on a preferred setting, favorite setting, or timed setting, associated with the person.

In one example, the rhythmic motion may be a complex rhythmic motion (e.g. a person's dancing motion) formed by a number of simple, coordinated motion (e.g. the person's head motion, neck motion, left/right hand motion, left/right wrist motion, left/right finger motion, left/right arm motion, left/right shoulder motion, waist motion, hip motion, left leg motion, left foot motion, right leg motion, etc.). A stride may correspond to a period or cycle of the complex rhythmic motion. A step segment may correspond to a simple motion in the stride (a "step" within a cycle of the complex motion). A stride may be formed by combining a series of N consecutive step segments. A stride may be decomposed into N step segments A step segment may correspond to a simple motion, or no motion.

In one embodiment, the monitoring may include detecting some event/action, e.g. the person falling down, the person acting in a rush, the person is doing some activity such as dancing, playing, sitting down, standing up, hopping, jumping, the person is in a good/bad mood/certain emotional state, etc. The response may include: alarming a caregiver/caretaker/manager/police/doctor/emergency response service or team; recording/monitoring the activity for health monitoring purpose: counting the amount of steps; determining if daily activity/exercise target is achieved; or prompting the person for a preferred action (e.g. play matching music during exercise) or environment setting.

In one embodiment, the object may be a dog; and the rhythmic motion may be the gait. The response action may be to prepare dog food/drink, water, lock/unlock door, adjust temperature/window/fan, etc.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks, and optical disks. Storage devices suitable for tangibly embodying computer program instructions and data include all forms of non-volatile memory, including by way of example semiconductor memory devices, such as EPROM. EEPROM, and flash memory devices; magnetic disks such as internal hard disks and removable disks; magneto-optical disks, and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for rhythmic motion monitoring, comprising:
   a transmitter configured for transmitting a first wireless signal in a venue through a wireless multipath channel of the venue;
   a receiver configured for receiving a second wireless signal through the wireless multipath channel, wherein
     the second wireless signal differs from the first wireless signal due to the wireless multipath channel which is impacted by a rhythmic motion of an object in the venue,
     the rhythmic motion comprises a gait of the object,
     the object is not in line-of-sight of the transmitter,
     the object is not in line-of-sight of the receiver,
     the first wireless signal and the second wireless signal are WiFi signals compliant to a data communication standard comprising one of: IEEE 802.11, IEEE802.11n/ac/ax/be, or WiFi; and
   a processor configured for:
     obtaining a time series of channel information (CI) of the wireless multipath channel based on the second wireless signal, wherein each CI is one of: channel state information (CSI), channel frequency response (CFR), or channel impulse response (CIR),
     computing a characteristic of the time series of CI (TSCI),
     computing a time series of intermediate quantity (IQ) based on the characteristic of the TSCI, wherein the IQ comprises a moving speed of the object, wherein the moving speed is a gait speed of the object and is computed based on a similarity score of a respective pair of temporally adjacent CI of the TSCI,
     determining a time window and a plurality of sliding sub-windows in the time window,
     computing a plurality of autocorrelation functions (ACF's) of the moving speed, wherein each ACF is computed for a respective sliding sub-window in the time window,
     performing peak detection on each ACF of the moving speed,
     detecting the time window as a stable period based on detected peaks of the plurality of ACF's in the time window,
     monitoring the rhythmic motion of the object based on analyzing the time series of IQ in the stable period to obtain gait related features, and
     identifying the object based on the gait related features.

2. The system of claim 1, wherein the rhythmic motion further comprises at least one of:
   a walking motion, a marching motion, a pacing motion, a running motion, a galloping action, a trotting action, a body motion, a leg motion, a hand motion, a finger motion, a trunk motion, a torso motion, a head motion,
   a repeated motion, a complex repeated motion, a robotic motion, a mechanic motion, a wind-induced motion, a curtain motion, a current-induced motion, a fluid motion, a vibration, an earthquake, a tremor, a shaking motion, a quivering motion, a trembling motion,
   a musical motion, a dancing motion, an oscillation, a regular motion, a periodic motion, a breathing motion, a heart beat, a palpitating motion, a relaxation oscillation, an increasing motion, a decreasing motion, an expanding motion, a contracting motion, a pulsating motion, a pumping motion, a pounding motion, a thudding motion, a throbbing motion, a hammering motion,
   an alternating motion, a coordinated motion, a combination of multiple repeated motion, a modulated motion, a mixed motion, a composite motion with at least one underlying rhythm, a motion coupled to another rhythmic motion of another object, or a motion coupled to a rhythm.

3. The system of claim 1, wherein the IQ comprises at least one of:
   a time stamp, a starting time, an ending time, a time code, a timing, a time period, a time duration, a frequency, a period, a cycle, a rhythm, a pace, a count, an indicator, an occurrence, a state, a set,
   a distance, a displacement, a direction, an acceleration, an angular distance, an angular speed, an angular acceleration, a change of location, a change of direction, a change of speed, a change of acceleration, a proximity, a presence, an absence, an appearance, a disappearance, a location, a statistics, a motion statistics, a breathing statistics, a distance statistics, a speed statistics, an acceleration statistics, a metric, an l_k distance metric, an l_0 distance metric, an l_1 distance metric, an absolute distance metric, an l_2 distance metric, a Euclidean distance metric, an l_infinity distance metric, a path, a volume, a mass, a surface area, a shape, a posture, an energy,
   a trend, a time sequence, a label, a tag, a class, a category, a time profile, a time quantity, a frequency quantity, a transient quantity, an incremental quantity, an instantaneous quantity, an averaged quantity, a locally averaged quantity, a filtered quantity, a quantity change, a repeating quantity,
   an event, a recognized event, a recognized motion sequence, a gesture, a hand gesture, a finger gesture, a wrist gesture, an elbow gesture, an arm gesture, a shoulder gesture, a head gesture, a facial gesture, a neck gesture, a waist gesture, a leg gesture, a foot gesture,
   a maximum, a minimum, a constrained maximum, a constrained minimum, a local maximum, a local minimum, a first local maximum, a first local minimum, a k-th local maximum, a k-th local minimum, an average, a weighted average, a percentile, a mean, a median, a mode, a trimmed mean, a conditional mean, a conditional statistics, an ordered statistics, a variance, a skewness, a kurtosis, a moment, a high order moment, a cumulant, a correlation, a covariance, a co-skewness, a co-kurtosis, a first order statistics, a second order statistics, a third order statistics, a high order statistics, a robust quantity, an argument associated with another quantity,
a feature of a CI, a complex component of a CI, a magnitude of the complex component, a phase of the complex component, a function of the complex component of the CI, a polynomial of the magnitude of the complex component, a square of the magnitude of the complex component, a time series of the feature of CI, an autocorrelation function of the feature of CI, and a function of another quantity.

4. The system of claim 1, wherein the processor is further configured for:
identifying the time window as the stable period when the object has a stable rhythmic motion, wherein there are at least two stable cycles of TSCI in the time window;
determining a time stamp associated with the stable rhythmic motion; and
adding the time stamp to the time window when at least one of the following is satisfied:
a weighted average of the moving speed in a sliding window associated with the time stamp is greater than a first threshold,
a feature of an autocorrelation function of the moving speed around the time stamp is greater than a second threshold, and
another criterion associated with the time stamp.

5. The system of claim 4, wherein the processor is further configured for:
computing at least one local characteristic of the IQ in the time window of the stable rhythmic motion, wherein the at least one local characteristic comprises at least one of: a local maximum, local minimum, zero crossing, local maximum of a derivation of the IQ, local minimum of the derivative, and zero crossing of the derivative;
segmenting the time window into at least one step segment based on time stamps associated with the at least one local characteristic of the IQ, each step segment spanning from a time associated with a local characteristic to another time associated with a next local characteristic; and
identifying at least one motion cycle, each motion cycle comprising N consecutive step segments, wherein N is a positive integer.

6. The system of claim 5, wherein the processor is further configured for:
computing at least one motion feature based on at least one of: the IQ in the time window of the stable rhythmic motion, the at least one local characteristic of the IQ, the at least one step segment, and the at least one motion cycle.

7. The system of claim 6, wherein:
the at least one motion feature is associated with at least one of: a time stamp in the time window and the at least one motion cycle; and
the at least one motion feature comprises at least one of the following speed-related features:
a motion speed,
a mean speed being A-average of motion speed in a subwindow of the time window around the time stamp, wherein the subwindow is at least one of: the whole time window, a sliding window, at least one motion cycle, at least one step segment and another subwindow, and wherein A-average comprises at least one of: an average, a weighted average and a trimmed mean,
a mean-subtracted speed being a motion speed minus a mean speed, a maximum speed being maximum of motion speed within the subwindow, a minimum speed being minimum of motion speed within the subwindow, a speed variance being variance of motion speed within the subwindow, a speed deviation being X-percentile of sample distribution of mean-subtracted speed in the subwindow, wherein X is a number between 0 and 100,
a maximum positive speed deviation being maximum of mean-subtracted speed in the subwindow, a maximum negative speed deviation being minimum of mean-subtracted speed in the subwindow, a speed peak variance being variance of local peak (local maximum) of motion speed in the subwindow, a speed valley variance being variance of local valley (local minimum) of motion speed in the subwindow,
at least one k-th speed-ACF-peak (k-SAP) being a k-th SAP at the time stamp, wherein SAP (speed-ACF-peak) is a local peak of an autocorrelation function (ACF) of motion speed at the time stamp, wherein k is a non-negative integer, a mean k-SAP being A-average of k-SAP in the subwindow, a k-SAP variance being variance of k-SAP in the subwindow, a k-SAP-difference (k-SAPD) being difference of k-th SAP and (k+1)-th SAP at the time stamp, a mean k-SAPD being A-average of k-SAPD in the subwindow, a k-SAPD variance being variance of k-SAPD in the subwindow, a speed-ACF-peak-count (SAPC) being a count of significant SAP at the time stamp, a mean SAPC being A-average of SAPC in the subwindow, a SAPC variance being variance of SAPC in the subwindow, a SAPC-pdf being a sample probability of SAPC being k in the subwindow, a SAPC-difference (SAPCD) being a difference of the SAPC and another SAPC at an adjacent time stamp, a mean SAPCD being A-average of SAPCD in the subwindow, a SAPCD variance being variance of SAPCD in the subwindow,
a speed recurrent plot (SRP) being a 2-dimensional plot of R(i,j), wherein i and j are running time indices in the subwindow, wherein R(i,j) is a similarity score of a first vector at time i and a second vector at time j, wherein each of first and second vectors is a vector at a time t comprising at least one speed-related feature in a sliding subwindow of the time window around the time t,
a SRP feature comprising at least one of: recurrence rate, determinism, entropy, average diagonal line, and another feature, of the SRP,
a generalized recurrent plot (GRP) being a 2-dimensional plot of R(i,j), wherein i and j are running time indices in the subwindow, wherein R(i,j) is a similarity score of a first vector at time i and a second vector at time j, wherein each of first and second vectors is a vector at a time t comprising at least one motion feature in a sliding subwindow of the time window around the time t,
a GRP feature comprising at least one of: recurrence rate, determinism, entropy, average diagonal line, and another feature, of the GRP,
a TSA feature of a time-scaled ACF (TSA), the TSA being an ACF of a speed-related feature in a subwindow of the time stamp with the ACF time axis scaled such that its first peak occurs at a selected time lag, a speed harmonic ratio associated with a motion cycle, each being a ratio of sum of amplitude of even harmonics of Fourier transform of motion speed in the motion cycle to sum of amplitude of odd harmonics of the Fourier transform, a speed harmonic feature associated with a motion cycle, being computed based on a function of even terms of a frequency transform of motion speed of the motion cycle and on the function of odd terms of the frequency transform, a generalized speed harmonic feature associated with the at least one motion cycle and computed based on a first function of even terms of a transform of speed-related features in the at least one motion cycle and a second function of odd terms of the transform, a generalized harmonic feature associated with the at least one motion cycle and computed based on a first function of even terms of a transform of motion features in the at least one motion cycle and a second function of odd terms of the transform, a left-right-step speed symmetry feature, a function of at least one of the above features, and a function of another feature.

8. The system of claim 6, wherein:

the at least one motion feature is associated with at least one of: a time stamp in the time window and the at least one motion cycle; and the at least one motion feature comprises at least one of the following acceleration-related features:

a motion acceleration being a derivative of a motion speed, a mean acceleration being A-average of motion acceleration in a subwindow of the time window around the time stamp, wherein the subwindow is at least one of: the whole time window, a sliding window, at least one motion cycle, at least one step segment and another subwindow, wherein A-average comprises at least one of: an average, a weighted average and a trimmed mean, a mean-subtracted acceleration being a motion acceleration minus a mean acceleration, a maximum acceleration being maximum of motion acceleration within the subwindow, a minimum acceleration being minimum of motion acceleration within the subwindow, an acceleration variance being variance of motion acceleration within the subwindow, an acceleration deviation being X-percentile of sample distribution of mean-subtracted acceleration in the subwindow, wherein X is a number between 0 and 100, a maximum positive acceleration deviation being maximum of mean-subtracted acceleration in the subwindow, and a maximum negative acceleration deviation being minimum of mean-subtracted acceleration in the subwindow, an acceleration peak variance being variance of local peak (local maximum) of motion acceleration in the subwindow, an acceleration valley variance being variance of local valley (local minimum) of motion acceleration in the subwindow, at least one k-th acceleration-ACF-peak (k-AAP) being a k-th AAP at the time stamp, wherein AAP (acceleration-ACF-peak) is a local peak of an autocorrelation function (ACF) of motion acceleration at the time stamp, wherein k is a non-negative integer, a mean k-AAP being A-average of k-AAP in the subwindow, a k-AAP variance being variance of k-AAP in the subwindow, a k-AAP-difference (k-AAPD) being difference of k-th AAP and (k+1)-th AAP at the time stamp, a mean k-AAPD being A-average of k-AAPD in the subwindow, a k-AAPD variance being variance of k-AAPD in the subwindow, an acceleration-ACF-peak-count (AAPC) being a count of significant AAP at the time stamp, a mean AAPC being A-average of AAPC in the subwindow, an AAPC variance being variance of AAPC in the subwindow, an AAPC-pdf being a sample probability of AAPC being k in the subwindow, an AAPC-difference (AAPCD) being a difference of the AAPC and another AAPC at an adjacent time stamp, a mean AAPCD being A-average of AAPCD in the subwindow, an AAPCD variance being variance of AAPCD in the subwindow, an acceleration recurrent plot (RP) being a 2-dimensional plot of R(i,j), wherein i and j are running time indices in the subwindow, wherein R(i,j) is a similarity score of a first vector at time i and a second vector at time j, wherein each of first and second vectors is a vector at a time t comprising at least one gait-acceleration-related feature in a sliding subwindow of the time window around the time t, an acceleration recurrent plot (RP) feature each comprising at least one of: recurrence rate, determinism, entropy, average diagonal line, and another feature, of the acceleration RP, a TSA feature of a time-scaled ACF (TSA), the TSA being an ACF of a gait-acceleration-related feature in a subwindow of the time stamp with the ACF time axis scaled such that its first peak occurs at a selected time lag, an acceleration harmonic ratio associated with a motion cycle, being a ratio of sum of amplitude of even harmonics of Fourier transform of motion acceleration in the motion cycle to sum of amplitude of odd harmonics of the Fourier transform, an acceleration harmonic feature associated with a motion cycle, being computed based on a function of even terms of a frequency transform of motion acceleration of the motion cycle and on the function of odd terms of the frequency transform, a generalized acceleration harmonic feature associated with the at least one motion cycle and computed based on a first function of even terms of a transform of gait-acceleration-related features in the at least one motion cycle and a second function of odd terms of the transform, a left-right-step acceleration symmetry feature, a function of at least one of the above features, and a function of another feature.

9. The system of claim 6, wherein:

the at least one motion feature is associated with a time stamp in the time window and the at least one step segment (SSeg); and the at least one motion feature comprises at least one of the following step-related features:

a motion speed, a motion acceleration being a derivative of motion speed, a step length being an integration of motion speed over a SSeg around the time stamp, a step period being duration of the SSeg, a step frequency being inversely proportion to the step period, a stepwise mean speed being A-average of motion speed in the SSeg, wherein A-average comprises at least one of: an average, a weighted average and a trimmed mean, a stepwise max speed being maximum motion speed in the SSeg, a stepwise min speed being minimum motion speed in the SSeg, a stepwise speed variance being variance of motion speed in the SSeg, a stepwise speed deviation being X-percentile of sample distribution of mean-subtracted speed in the SSeg, wherein the mean-subtracted speed is motion speed minus a stepwise mean speed and X is a number between 0 and 100, a stepwise mean acceleration being A-average of motion acceleration in the SSeg, a stepwise max acceleration being maximum motion acceleration in the SSeg, a stepwise min acceleration being minimum motion acceleration in the SSeg, a stepwise acceleration variance being variance of motion acceleration in the SSeg, a stepwise acceleration deviation being X-percentile of sample distribution of mean-subtracted acceleration in the SSeg, wherein the mean-subtracted acceleration is motion acceleration minus a stepwise mean acceleration, a step feature (SF) being at least one of: a step length, step period, step frequency, stepwise mean speed, stepwise max speed, stepwise min speed, stepwise speed variance, stepwise speed deviation, stepwise speed peak variance, stepwise speed valley variance, k-th stepwise speed-ACF-peak (k-SSAP), mean k-SSAP, k-SSAP variance, k-SSAP difference (k-SSAPD), mean k-SSAPD, k-SSAPD variance, stepwise speed-ACF-peak-count (SSAPC), mean SSAPC, SSAPC variance, SSAPC-pdf, SSAPC-difference (SSAPCD), mean SSAPCD, SSAPCD variance, stepwise speed recurrent plot (SSRP), SSRP feature, stepwise time-scaled speed ACF (STSSA) feature, stepwise speed harmonic ratio, stepwise speed harmonic feature, stepwise generalized speed harmonic feature, stepwise speed symmetry measure, stepwise mean acceleration, stepwise max acceleration, stepwise min acceleration, stepwise acceleration variance, stepwise acceleration deviation, stepwise speed peak variance, stepwise speed valley variance, k-th stepwise acceleration-ACF-peak (k-SAAP), mean k-SAAP, k-SAAP variance, k-SAAP difference (k-SAAPD), mean k-SAAPD, k-SAAPD variance, stepwise acceleration-ACF-peak-count (SAAPC), mean SAAPC, SAAPC variance, SAAPC-pdf, SAAPC-difference (SAAPCD), mean SAAPCD, SAAPCD variance, stepwise acceleration RP (SARP), SARP feature, stepwise time-scaled acceleration ACF (STSAA) feature, stepwise acceleration harmonic ratio, stepwise acceleration harmonic feature, stepwise generalized acceleration harmonic feature, stepwise symmetry measure, a function of at least one of the above statistics, a function of another statistics, and a function of another SF, a mean SF being A-average of the SF in a subwindow of the time window around the time stamp, wherein the subwindow is at least one of: the whole time window, a sliding window, at least one motion cycle, at least one SSeg and another subwindow, an odd mean SF being A-average of the SF of odd SSegs in the subwindow, an even mean SF being A-average of the SF of even SSegs in the subwindow, a max SF being maximum of the SF in the subwindow, an odd max SF being maximum of the SF of odd SSegs in the subwindow, an even max SF being maximum of the SF of even SSegs in the subwindow, a min SF being minimum of the SF in the subwindow, an odd min SF being minimum of the SF of odd SSegs in the subwindow, an even min SF being minimum of the SF of even SSegs in the subwindow, a SF variance being variance of SF in the subwindow, an odd SF variance being variance of SF of odd SSegs in the subwindow, an even SF variance being variance of SF of even SSegs in the subwindow, a SF deviation being X-percentile of sample distribution of mean-subtracted SF in the subwindow, wherein the mean-subtracted SF is SF minus mean SF, an odd SF deviation being X-percentile of sample distribution of mean-subtracted SF of odd SSegs in the subwindow, an even SF deviation being X-percentile of sample distribution of mean-subtracted SF of even SSegs in the subwindow, statistics of SF being at least one of: mean SF, max SF, min SF, SF variance, SF deviation, and another statistics of SF, odd statistics of SF being at least one of: odd mean SF, odd max SF, odd min SF, odd SF variance, odd SF deviation, and another odd statistics of SF, even statistics of SF being at least one of: even mean SF, even max SF, even min SF, even SF variance, even SF deviation, and another even statistics of SF, a left SF, right SF, front left SF, front right SF, back left SF, back right SF, wavefront SF, odd wavefront SF, even wavefront SF, a ratio of even statistics of the SF and odd statistics of the SF, a difference of even statistics of the SF and odd statistics of the SF, a similarity measure of even statistics of the SF and odd statistics of the SF, a function of at least one of: statistics of SF, odd statistics of SF, and even statistics of SF, a ratio of a function of even statistics of the SF and a function of odd statistics of the SF, a first function of a second function of even statistics of the SF and a third function of odd statistics of the SF, and another statistics of the SF.

10. The system of claim 6, wherein:

the at least one motion feature is associated with at least one of: a time stamp in the time window and at least one motion cycle; and the at least one motion feature comprises at least one of the following stride-related features:

a motion speed, a motion acceleration being a derivative of motion speed, a stride length being an integration of motion speed over a motion cycle around the time stamp, a stride period being duration of the motion cycle, a stride frequency being inversely proportion to the stride period, a stride-wise mean speed being A-average of motion speed in the motion cycle, wherein A-average comprises at least one of: an average, a weighted average and a trimmed mean, a stride-wise max speed being maximum motion speed in the motion cycle, a stride-wise min speed being minimum motion speed in the motion cycle, a stride-wise speed variance being variance of motion speed in the motion cycle, a stride-wise speed deviation being X-percentile of sample distribution of mean-subtracted speed in the motion cycle, wherein the mean-subtracted speed is motion speed minus a stride-wise mean speed and X is a number between 0 and 100, a stride-wise mean acceleration being A-average of motion acceleration in the motion cycle, a stride-wise max acceleration being maximum motion acceleration in the motion cycle, a stride-wise min acceleration being minimum motion acceleration in the motion cycle, a stride-wise acceleration variance being variance of motion acceleration in the motion cycle, a stride-wise acceleration deviation being X-percentile of sample distribution of mean-subtracted acceleration in the motion cycle, wherein the mean-subtracted acceleration is motion acceleration minus a stride-wise mean acceleration, a stride feature (SF) being at least one of: a stride length, stride period, stride frequency, stride-wise mean speed, stride-wise max speed, stride-wise min speed, stride-wise speed variance, stride-wise speed deviation, stride-wise speed peak variance, stride-wise speed valley variance, k-th stride-wise speed-ACF-peak (k-SSAP), mean k-SSAP, k-SSAP variance, k-SSAP difference (k-SSAPD), mean k-SSAPD, k-SSAPD variance, stride-wise speed-ACF-peak-count (SSAPC), mean SSAPC, SSAPC variance, SSAPC-pdf, SSAPC-difference (SSAPCD), mean SSAPCD, SSAPCD variance, stride-wise speed recurrent plot (SSRP), SSRP feature, stride-wise time-scaled speed ACF (STSSA) feature, stride-wise speed harmonic ratio, stride-wise speed harmonic feature, stride-wise generalized speed harmonic feature, stride-wise speed symmetry measure, stride-wise mean acceleration, stride-wise max acceleration, stride-wise min acceleration, stride-wise acceleration variance, stride-wise acceleration deviation, stride-wise speed peak variance, stride-wise speed valley variance, k-th stride-wise acceleration-ACF-peak (k-SAAP), mean k-SAAP, k-SAAP variance, k-SAAP difference (k-SAAPD), mean k-SAAPD, k-SAAPD variance, stride-wise acceleration-ACF-peak-count (SAAPC), mean SAAPC, SAAPC variance, SAAPC-pdf, SAAPC-difference (SAAPCD), mean SAAPCD, SAAPCD variance, stride-wise acceleration RP (SARP), SARP feature, stride-wise time-scaled acceleration ACF (STSAA) feature, stride-wise acceleration harmonic ratio, stride-wise acceleration harmonic feature, stride-wise generalized acceleration harmonic feature, stride-wise symmetry measure, a function of at least one of the above statistics, a function of another statistics, and a function of another SF, a mean SF being A-average of the SF in a subwindow of the time window around the time stamp, wherein the subwindow is at least one of: the whole time window, a sliding window, at least one motion cycle, at least one step segments and another subwindow, an odd mean SF being A-average of the SF of odd motion cycles in the subwindow, an even mean SF being A-average of the SF of even motion cycles in the subwindow, a max SF being maximum of the SF in the subwindow, an odd max SF being maximum of the SF of odd motion cycles in the subwindow, an even max SF being maximum of the SF of even motion cycles in the subwindow, a min SF being minimum of the SF in the subwindow, an odd min SF being minimum of the SF of odd motion cycles in the subwindow, an even min SF being minimum of the SF of even motion cycles in the subwindow, a SF variance being variance of SF in the subwindow, an odd SF variance being variance of SF of odd motion cycles in the subwindow, an even SF variance being variance of SF of even motion cycles in the subwindow, a SF deviation being X-percentile of sample distribution of mean-subtracted SF in the subwindow, wherein the mean-subtracted SF is SF minus mean SF, an odd SF deviation being X-percentile of sample distribution of mean-subtracted SF of odd motion cycles in the subwindow, an even SF deviation being X-percentile of sample distribution of mean-subtracted SF of even motion cycles in the subwindow, statistics of SF being at least one of: mean SF, max SF, min SF, SF variance, SF deviation, and another statistics of SF, odd statistics of SF being at least one of: odd mean SF, odd max SF, odd min SF, odd SF variance, odd SF deviation, and another odd statistics of SF, even statistics of SF being at least one of: even mean SF, even max SF, even min SF, even SF variance, even SF deviation, and another even statistics of SF, a left SF, right SF, front left SF, front right SF, back left SF, back right SF, wavefront SF, odd wavefront SF, even wavefront SF, a ratio of even statistics of SF and odd statistics of SF, a difference of even statistics of SF and odd statistics of SF, a similarity measure of even statistics of SF and odd statistics of SF, a function of at least one of: statistics of SF, odd statistics of SF, and even statistics of SF, a ratio of a function of even statistics of SF and a function of odd statistics of SF, a first function of: a second function of even statistics of SF and a third function of odd statistics of the SF, and another statistics of the SF.

11. The system of claim 6, wherein:

the N consecutive step segments (N-step) have N phases;

an i-th phase segment (i-SSeg) is the i-th step segment in the N-step, i being a positive integer not greater than N;

the at least one motion feature is associated with at least one of: a time stamp in the time window, the at least one step segment (SSeg) and the at least one motion cycles; and the at least one motion feature comprises at least one of the following N-step-related features:

a motion speed, a motion acceleration being a derivative of motion speed, a step length being an integration of motion speed over a SSeg around the time stamp, a step period being duration of the SSeg, a step frequency being inversely proportion to the step period, a stepwise mean speed being A-average of motion speed in the SSeg, wherein A-average comprises at least one of: an average, a weighted average and a trimmed mean, a stepwise max speed being maximum motion speed in the SSeg, a stepwise min speed being minimum motion speed in the SSeg, a stepwise speed variance being variance of motion speed in the SSeg, a stepwise speed deviation being X-percentile of sample distribution of mean-subtracted speed in the SSeg, wherein the mean-subtracted speed is motion speed minus a stepwise mean speed and X is a number between 0 and 100, a stepwise mean acceleration being A-average of motion acceleration in the SSeg, a stepwise max acceleration being maximum motion acceleration in the SSeg, a stepwise min acceleration being minimum motion acceleration in the SSeg, a stepwise acceleration variance being variance of motion acceleration in the SSeg, a stepwise acceleration deviation being X-percentile of sample distribution of mean-subtracted acceleration in the SSeg, wherein the mean-subtracted acceleration is motion acceleration minus a stepwise mean acceleration, an N-step length being an integration of motion speed over a N-step around the time stamp, N-step period being duration of the N-step, N-step frequency being inversely proportion to N-step period, N-step mean speed being A-average of motion speed in the N-step, N-step max speed being local maximum of motion speed in the N-step, N-step min speed being local minimum of motion speed in the N-step, N-step speed variance being variance of motion speed in the N-step, N-step speed deviation being X-percentile of sample distribution of mean-subtracted speed in the N-step, wherein the mean-subtracted speed is motion speed minus N-step mean speed and X is a number between 0 and 100, an N-step mean acceleration being A-average of motion acceleration in the N-step, N-step max acceleration being local maximum of motion acceleration in the N-step, N-step min acceleration being local minimum of motion acceleration in the N-step, N-step acceleration variance being variance of motion acceleration in the N-step, N-step acceleration deviation being X-percentile of sample distribution of mean-subtracted acceleration in the N-step, wherein the mean-subtracted acceleration is motion acceleration minus N-step mean acceleration, a step feature (SF) being at least one of: a step length, step period, step frequency, stepwise mean speed, stepwise max speed, stepwise min speed, stepwise speed variance, stepwise speed deviation, stepwise speed peak variance, stepwise speed valley variance, k-th stepwise speed-ACF-peak (k-SSAP), mean k-SSAP, k-SSAP variance, k-SSAP difference (k-SSAPD), mean k-SSAPD, k-SSAPD variance, stepwise speed-ACF-peak-count (SSAPC), mean SSAPC, SSAPC variance, SSAPC-pdf, SSAPC-difference (SSAPCD), mean SSAPCD, SSAPCD variance, stepwise speed recurrent plot (SSRP), SSRP feature, stepwise time-scaled speed ACF (STSSA) feature, stepwise speed harmonic feature, stepwise speed generalized speed harmonic feature, stepwise speed symmetry measure, stepwise mean acceleration, stepwise max acceleration, stepwise min acceleration, stepwise acceleration variance, stepwise acceleration deviation, stepwise speed peak variance, stepwise speed valley variance, k-th stepwise acceleration-ACF-peak (k-SAAP), mean k-SAAP, k-SAAP variance, k-SAAP difference (k-SAAPD), mean k-SAAPD, k-SAAPD variance, stepwise acceleration-ACF-peak-count (SAAPC), mean SAAPC, SAAPC variance, SAAPC-pdf, SAAPC-difference (SAAPCD), mean SAAPCD, SAAPCD variance, stepwise acceleration RP (SARP), SARP feature, stepwise time-scaled acceleration ACF (STSAA) feature, stepwise acceleration harmonic ratio, stepwise acceleration harmonic feature, stepwise generalized acceleration harmonic feature, stepwise symmetry measure, N-step length, N-step period, N-step frequency, N-step mean speed, N-step max speed, N-step min speed, N-step speed variance, N-step speed deviation, N-step speed peak variance, N-step speed valley variance, k-th N-step speed-ACF-peak (k-NSAP), mean k-NSAP, k-NSAP variance, k-NSAP difference (k-NSAPD), mean k-NSAPD, k-NSAPD variance, N-step speed-ACF-peak-count (NSAPC), mean NSAPC, NSAPC variance, NSAPC-pdf, NSAPC-difference (NSAPCD), mean NSAPCD, NSAPCD variance, N-step speed recurrent plot (NSRP), NSRP feature, N-step time-scaled speed ACF (NTSSA) feature, N-step speed harmonic ratio, N-step speed harmonic feature, N-step generalized speed harmonic feature, N-step speed symmetry measure, N-step mean acceleration, N-step max acceleration, N-step min acceleration, N-step acceleration variance, N-step acceleration deviation, N-step speed peak variance, N-step speed valley variance, k-th N-step acceleration-ACF-peak (k-NAAP), mean k-NAAP, k-NAAP variance, k-NAAP difference (k-NAAPD), mean k-NAAPD, k-NAAPD variance, N-step acceleration-ACF-peak-count (NAAPC), mean NAAPC, NAAPC variance, NAAPC-pdf, NAAPC-difference (NAAPCD), mean NAAPCD, NAAPCD variance, N-step acceleration RP (NARP), NARP feature, N-step time-scaled acceleration ACF (NTSAA) feature, N-step acceleration harmonic ratio, N-step acceleration harmonic feature, N-step generalized acceleration harmonic feature, N-step symmetry measure, a function of at least one of the above statistics, a function of another statistics, and a function of another SF, wherein an i-SF is a stepwise SF associated with an i-SSeg, a mean SF being A-average of the SF in a subwindow of the time window around the time stamp, wherein the subwindow is at least one of: the whole time window, a sliding window, at least one motion cycle, at least one SSeg and another subwindow, a mean i-SF being A-average of the SF of i-SSeg (i-SF) in the subwindow, a max SF being maximum of the SF in the subwindow, a max i-SF being maximum of the i-SF in the subwindow, a min SF being minimum of the SF in the subwindow, a min i-SF being minimum of the i-SF in the subwindow, an SF variance being variance of SF in the subwindow, an i-SF variance being variance of i-SF in the subwindow, an SF deviation being X-percentile of sample distribution of mean-subtracted SF in the subwindow, wherein the mean-subtracted SF is SF minus mean SF, an i-SF deviation being X-percentile of sample distribution of mean-subtracted i-SF in the subwindow, wherein the mean-subtracted i-SF is i-SF minus mean i-SF, SF statistics being at least one of: mean SF, max SF, min SF, SF variance, SF deviation, and another statistics of SF, i-SF statistics being at least one of: mean i-SF, max i-SF, min i-SF, i-SF variance, i-SF deviation, and another statistics of i-SF, a ratio of a SF statistics and another SF statistics, a ratio of an i-SF statistics and another i-SF statistics with same i, a ratio of an i-SF statistics and another i-SF statistics with different i, a ratio of an i-SF statistics and the same i-SF statistics with different i, a ratio of a SF statistics and an i-SF statistics, a difference of a SF statistics and another SF statistics, a difference of an i-SF statistics and another i-SF statistics with same i, a difference of an i-SF statistics and another i-SF statistics with different i, a difference of an i-SF statistics and the same i-SF statistics with different i, a difference of a SF statistics and an i-SF statistics, a similarity measure of a SF statistics and another SF statistics, a similarity measure of an i-SF statistics and another i-SF statistics with same i, a similarity measure of an i-SF statistics and another i-SF statistics with different i, a similarity measure of an i-SF statistics and the same i-SF statistics with different i, a similarity measure of a SF statistics and an i-SF statistics, a function of at least one of: at least one SF statistics, and at least one i-SF statistics, a ratio of a function of a i-SF statistics and another function of another i-SF statistics with same i, a ratio of a function of a i-SF statistics and another function of another i-SF statistics with different i, a ratio of a function of a i-SF statistics and another function of the same i-SF statistics with different i, a composite function of: a function of a i-SF statistics and another function of another i-SF statistics with same i, a composite function of: a function of a i-SF statistics and another function of another i-SF statistics with different i, a composite function of: a function of a i-SF statistics and another function of the same i-SF statistics with different i, and another statistics of at least one of: at least one SF, and at least one i-SF.

12. The system of claim 5, wherein the processor is further configured for:
skipping the time window of the stable rhythmic motion when a quantity of local characteristics of the IQ is less than a threshold.

13. The system of claim 6, wherein the processor is further configured for:
communicating the at least one motion feature to a server.

14. The system of claim 6, wherein the processor is further configured for:
communicating the at least one motion feature to a user device; and
providing a presentation on the user device based on the at least one motion feature.

15. The system of claim 6, further comprising:
an additional transmitter configured for transmitting a third wireless signal through an additional wireless multipath channel; and
an additional receiver configured for receiving a fourth wireless signal through the additional wireless multipath channel, wherein the fourth wireless signal differs from the third wireless signal due to the additional wireless multipath channel which is impacted by the rhythmic motion of the object in the venue,
wherein the processor is further configured for:
obtaining an additional TSCI of the additional wireless multipath channel based on the fourth wireless signal;
computing an additional time series of IQ based on the additional TSCI; and
monitoring the rhythmic motion jointly based on the time series of IQ and the additional time series of IQ.

16. The system of claim 15, wherein:
the additional transmitter is the transmitter; and
the third wireless signal is the first wireless signal.

17. The system of claim 15, wherein:
the additional receiver is the receiver.

18. The system of claim 5, wherein:
each of the at least one local characteristic is a local maximum.

19. The system of claim 5, wherein the processor is further configured for:

applying a smoothing filter to the IQ to compute a time series of smoothed IQ in the time window of the stable rhythmic motion of the object; and
segmenting the time window into at least one step segment based on the smoothed IQ.

20. An apparatus for rhythmic motion monitoring in a venue where a transmitter and a receiver are located, comprising:
at least one of the transmitter and the receiver, wherein:
the transmitter is configured for transmitting a first wireless signal through a wireless multipath channel of the venue, and
the receiver is configured for receiving a second wireless signal through the wireless multipath channel, wherein
the second wireless signal differs from the first wireless signal due to the wireless multipath channel which is impacted by a rhythmic motion of an object in the venue,
the rhythmic motion comprises a gait of the object,
the object is not in line-of-sight of the transmitter,
the object is not in line-of-sight of the receiver,
the first wireless signal and the second wireless signal are WiFi signals compliant to a data communication standard comprising one of: IEEE 802.11, IEEE802.11n/ac/ax/be, or WiFi; and
a processor configured for:
obtaining a time series of channel information (CI) of the wireless multipath channel based on the second wireless signal, wherein each CI is one of: channel state information (CSI), channel frequency response (CFR), or channel impulse response (CIR),
computing a characteristic of the time series of CI (TSCI),
computing a time series of intermediate quantity (IQ) based on the characteristic of the TSCI, wherein the IQ comprises a moving speed of the object, wherein the moving speed is a gait speed of the object and is computed based on a similarity score of a respective pair of temporally adjacent CI of the TSCI,
determining a time window and a plurality of sliding sub-windows in the time window,
computing a plurality of autocorrelation functions (ACF's) of the moving speed, wherein each ACF is computed for a respective sliding sub-window in the time window,
performing peak detection on each ACF of the moving speed,
detecting the time window as a stable period based on detected peaks of the plurality of ACF's in the time window,
monitoring the rhythmic motion of the object based on analyzing the time series of IQ in the stable period to obtain gait related features, and
performing a task based on the gait related features.

21. The apparatus of claim 20, wherein the processor is further configured for:
computing at least one local characteristic of the IQ in the time window when the object has a stable rhythmic motion, wherein the at least one local characteristic comprises at least one of: a local maximum, local minimum, zero crossing, local maximum of a derivation of the IQ, local minimum of the derivative, and zero crossing of the derivative;
segmenting the time window into at least one step segment based on time stamps associated with the at least one local characteristic of the IQ, each step segment spanning from a time associated with a local characteristic to another time associated with a next local characteristic; and identifying at least one motion cycle, each motion cycle comprising N consecutive step segments, wherein N is a positive integer.

22. The apparatus of claim 21, wherein the processor is further configured for:

computing at least one motion feature based on at least one of: the IQ in the time window of the stable rhythmic motion, the at least one local characteristic of the IQ, the at least one step segment, and the at least one motion cycle.

23. A method, implemented by a processor, a memory communicatively coupled with the processor, and a set of instructions stored in the memory to be executed by the processor, comprising:

obtaining a time series of channel information (CI) of a wireless multipath channel of a venue, wherein:

a transmitter transmits a first wireless signal in a venue through the wireless multipath channel of the venue, a receiver receives a second wireless signal through the wireless multipath channel and computes the time series of CI (TSCI) of the wireless multipath channel based on the second wireless signal, each CI is one of: channel state information (CSI), channel frequency response (CFR), or channel impulse response (CIR), and the second wireless signal differs from the first wireless signal due to the wireless multipath channel which is impacted by a rhythmic motion of an object in the venue, the rhythmic motion comprises a gait of the object, the object is not in line-of-sight of the transmitter, the object is not in line-of-sight of the receiver, the first wireless signal and the second wireless signal are WiFi signals compliant to a data communication standard comprising one of: IEEE 802.11, IEEE802.11n/ac/ax/be, or WiFi;

computing a time series of intermediate quantity (IQ) based on the characteristic of the TSCI, wherein the IQ comprises a moving speed of the object, wherein the moving speed is a gait speed of the object and is computed based on a similarity score of a respective pair of temporally adjacent CI of the TSCI, determining a time window and a plurality of sliding sub-windows in the time window, computing a plurality of autocorrelation functions (ACF's) of the moving speed, wherein each ACF is computed for a respective sliding sub-window in the time window, performing peak detection on each ACF of the moving speed, detecting the time window as a stable period based on detected peaks of the plurality of ACF's in the time window, monitoring the rhythmic motion of the object based on analyzing the time series of IQ in the stable period; and performing a task based on the monitoring.

24. The apparatus of claim 23, further comprising:

computing at least one local characteristic of the IQ in the time window when the object has a stable rhythmic motion, wherein the at least one local characteristic comprises at least one of: a local maximum, local minimum, zero crossing, local maximum of a derivation of the IQ, local minimum of the derivative, and zero crossing of the derivative;

segmenting the time window into at least one step segment based on time stamps associated with the at least one local characteristic of the IQ, each step segment spanning from a time associated with a local characteristic to another time associated with a next local characteristic; and identifying at least one motion cycle, each motion cycle comprising N consecutive step segments, wherein N is a positive integer.

25. The method of claim 24, further comprising:

skipping the time window of the stable rhythmic motion when a quantity of local characteristics of the IQ is less than a threshold;

applying a smoothing filter to the IQ to compute a time series of smoothed IQ in the time window of the stable rhythmic motion of the object; and segmenting the time window into at least one step segment based on the smoothed IQ.

26. The method of claim 24, further comprising:

computing at least one motion feature based on at least one of: the IQ in the time window of the stable rhythmic motion, the at least one local characteristic of the IQ, the at least one step segment, and the at least one motion cycle, wherein:

the at least one motion feature is associated with at least one of: a time stamp in the time window, the at least one motion cycle, and the at least one step segment, and the at least one motion feature comprises at least one feature related to: a speed of the rhythmic motion, an acceleration being a derivative of the speed of the rhythmic motion, a stride, the at least one motion cycle, and/or the at least one step segment.

* * * * *